US010515241B2

United States Patent
Niikura et al.

(10) Patent No.: US 10,515,241 B2
(45) Date of Patent: Dec. 24, 2019

(54) SIGNAL TRANSMISSION DEVICE, SIGNAL TRANSMISSION METHOD, AND SIGNAL TRANSMISSION SYSTEM

(71) Applicant: Sony Corporation, Tokyo (JP)

(72) Inventors: Hideo Niikura, Tokyo (JP); Junya Matsui, Kanagawa (JP); Masakazu Yajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/093,320

(22) PCT Filed: Mar. 7, 2017

(86) PCT No.: PCT/JP2017/009013
§ 371 (c)(1),
(2) Date: Oct. 12, 2018

(87) PCT Pub. No.: WO2017/183341
PCT Pub. Date: Oct. 26, 2017

(65) Prior Publication Data
US 2019/0163941 A1 May 30, 2019

(30) Foreign Application Priority Data
Apr. 21, 2016 (JP) ................. 2016-085246

(51) Int. Cl.
*G06K 19/00* (2006.01)
*G06K 7/10* (2006.01)
(Continued)

(52) U.S. Cl.
CPC ........ *G06K 7/10366* (2013.01); *A01K 11/008* (2013.01); *G06K 19/0723* (2013.01);
(Continued)

(58) Field of Classification Search
USPC .......... 235/435, 439, 454, 487, 492
See application file for complete search history.

(56) References Cited

U.S. PATENT DOCUMENTS 10,212,922 B2   2/2019  Yajima et al.
2014/0291405 A1* 10/2014  Harkes ............... G06K 19/0716
                                                235/492
(Continued)

FOREIGN PATENT DOCUMENTS

EP   3 079 037 A1   10/2016
JP   2006-287767 A   10/2006
(Continued)

OTHER PUBLICATIONS

International Search Report and English translation thereof dated Jun. 13, 2017 in connection with International Application No. PCT/JP2017/009013.
(Continued)

*Primary Examiner* — Matthew Mikels
(74) *Attorney, Agent, or Firm* — Wolf, Greenfield & Sacks, P.C.

(57) ABSTRACT

[Object] To provide a signal transmission system capable of ascertaining positions or the like of mounting targets with more versatile and simpler configurations.
[Solution] A signal transmission device including: a power generation unit configured to generate power in accordance with a surrounding environment; a first communication unit configured to send a signal using the power generated by the power generation unit; a storage unit configured to store communication control information for controlling the first communication unit; a communication control unit configured to control the first communication unit on a basis of the communication control information; and a contactless communication unit configured to receive rewrite information for rewriting the communication control information stored in the storage unit by contactless communication.

18 Claims, 18 Drawing Sheets

(51) Int. Cl.
*H04B 1/04* (2006.01)
*H04B 1/3883* (2015.01)
*H04B 1/59* (2006.01)
*H04B 5/02* (2006.01)
*G06K 19/07* (2006.01)
*H04B 5/00* (2006.01)
*A01K 11/00* (2006.01)

(52) U.S. Cl.
CPC ............. *H04B 1/04* (2013.01); *H04B 1/3883* (2013.01); *H04B 1/59* (2013.01); *H04B 5/0037* (2013.01); *H04B 5/0062* (2013.01); *H04B 5/02* (2013.01)

(56) References Cited

U.S. PATENT DOCUMENTS

| | | |
|---|---|---|
| 2016/0378156 A1 | 12/2016 | Yajima |
| 2017/0054839 A1 | 2/2017 | Ishikawa et al. |
| 2018/0242515 A1 | 8/2018 | Yajima et al. |
| 2018/0279583 A1 | 10/2018 | Yajima et al. |
| 2018/0295809 A1 | 10/2018 | Yajima et al. |
| 2019/0116764 A1 | 4/2019 | Komatsu et al. |
| 2019/0133087 A1 | 5/2019 | Yajima et al. |
| 2019/0183436 A1 | 6/2019 | Yajima et al. |

FOREIGN PATENT DOCUMENTS

| | | |
|---|---|---|
| JP | 2008-073005 A | 4/2008 |
| JP | 2014-174949 A | 9/2014 |
| JP | 2015-109009 A | 6/2015 |
| WO | WO 2015/125517 A | 8/2015 |

OTHER PUBLICATIONS

Written Opinion and English translation thereof dated Jun. 13, 2017 in connection with International Application No. PCT/JP2017/009013.
International Preliminary Report on Patentability and English translation thereof dated Nov. 1, 2018 in connection with International Application No. PCT/JP2017/009013.
U.S. Appl. No. 15/571,344, filed Nov. 2, 2017, Yajima et al.
U.S. Appl. No. 15/753,043, filed Feb. 15, 2018, Yajima et al.
U.S. Appl. No. 15/759,016, filed Mar. 9, 2018, Yajima et al.
U.S. Appl. No. 16/093,173, filed Oct. 12, 2018, Komatsu et al.
U.S. Appl. No. 16/093,222, filed Oct. 12, 2018, Niikura et al.
U.S. Appl. No. 16/093,281, filed Oct. 12, 2018, Yajima et al.
U.S. Appl. No. 16/236,067, filed Dec. 28, 2018, Yajima et al.

* cited by examiner

FIG. 7

| ITEM | CONTENT |
|---|---|
| HARDWARE VERSION INFORMATION | 001 |
| SOFTWARE VERSION INFORMATION | 003 |
| IDENTIFICATION INFORMATION | 110001 |
| RECEPTION ADVISABILITY CONTROL INFORMATION | 0/1 |
| TRANSMISSION ADVISABILITY CONTROL INFORMATION | 0/1 |
| DESTINATION INFORMATION | 110003 |

FIG. 9

| CONTENT |
|---|
| DATA FORMAT INFORMATION OF SIGNAL |
| IDENTIFICATION INFORMATION OF SIGNAL TRANSMISSION DEVICE |
| MEASUREMENT INFORMATION BY SENSOR UNIT |

FIG. 11

| CONTENT | |
|---|---|
| DATA FORMAT INFORMATION OF SIGNAL | INFORMATION INCLUDED IN RECEIVED SIGNAL |
| IDENTIFICATION INFORMATION OF SIGNAL TRANSMISSION DEVICE | |
| MEASUREMENT INFORMATION BY SENSOR UNIT | |
| IDENTIFICATION INFORMATION OF SIGNAL TRANSMISSION DEVICE WHICH IS SUBSEQUENT RECEPTION DESTINATION | INFORMATION ADDED BY DEVICE RECEIVING SIGNAL |
| IDENTIFICATION INFORMATION OF SIGNAL TRANSMISSION DEVICE RECEIVING SIGNAL | |
| TIME AT WHICH SIGNAL IS RECEIVED | |
| RADIO WAVE INTENSITY OF RECEIVED SIGNAL | |

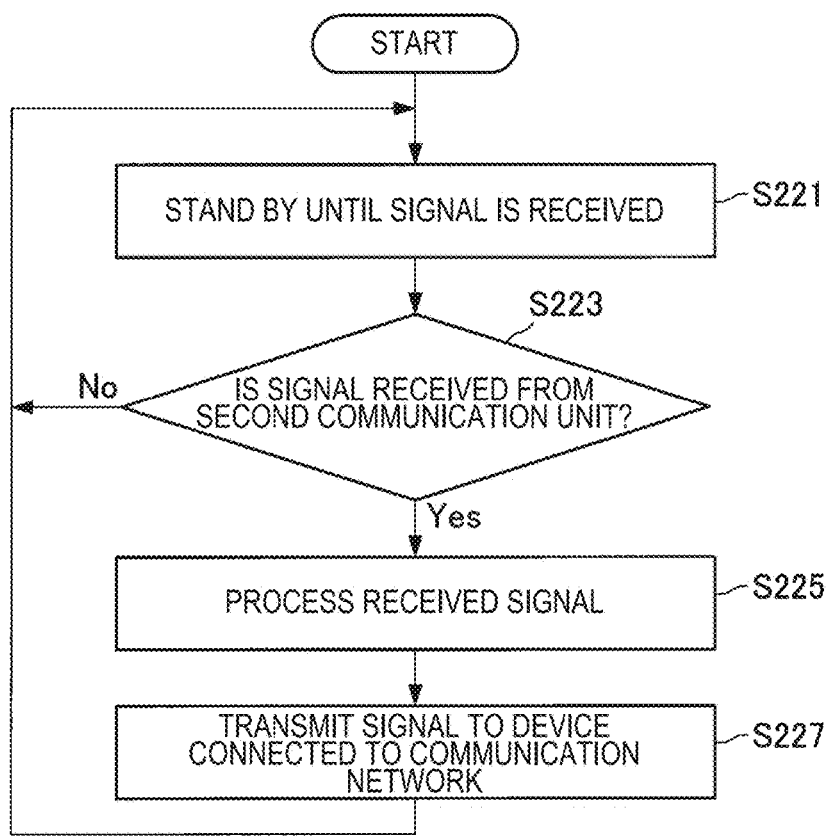

FIG. 13

| CONTENT |
|---|
| DATA FORMAT INFORMATION OF SIGNAL |
| IDENTIFICATION INFORMATION OF SIGNAL TRANSMISSION DEVICE |
| MEASUREMENT INFORMATION BY SENSOR UNIT |
| IDENTIFICATION INFORMATION OF SIGNAL TRANSMISSION DEVICE RECEIVING SIGNAL |
| TIME AT WHICH SIGNAL IS RECEIVED |
| RADIO WAVE INTENSITY OF RECEIVED SIGNAL |

SIGNAL TRANSMISSION DEVICE, SIGNAL TRANSMISSION METHOD, AND SIGNAL TRANSMISSION SYSTEM

CROSS-REFERENCE TO RELATED APPLICATIONS

This application is a U.S. National Stage entry under 35 U.S.C. § 371 of International Application No. PCT/JP2017/009013, filed in the Japan Patent Office on Mar. 7, 2017, which claims priority to Patent Application No. JP2016-085246, filed in the Japan Patent Office on Apr. 21, 2016, each of which is incorporated by reference herein in its entirety.

TECHNICAL FIELD

The present disclosure relates to a signal transmission device, a signal transmission method, and a signal transmission system.

BACKGROUND ART

In order to ascertain and manage states of targets which can freely move, senders or the like are mounted on the targets. For example, in order to manage domestic animals grazing in regions designated by fences or the like, senders or the like that have position detection functions are mounted on the domestic animals and positions of the domestic animals on which the senders are mounted are ascertained.

The following Patent Literature 1 discloses a technology for managing grazing of domestic animals by mounting identification tags with position detectors that acquire positional information using a global navigation satellite system (GNSS) on the domestic animals.

CITATION LIST

Patent Literature

Patent Literature 1: JP 2008-73005A

DISCLOSURE OF INVENTION

Technical Problem

In the technology disclosed in the foregoing Patent Literature 1, it is necessary to mount power sources on identification tags in order to receive signals from GNSS satellites. However, in a case in which batteries or the like are mounted in the identification tags as power sources, portability of the identification tags may deteriorate because of the weight of the power sources. In this case, since it is necessary to manage lifetimes of the batteries or the like mounted in the identification tags, management of mounting targets may be more complicated.

Accordingly, the present disclosure proposes a novel and improved signal transmission device, a novel and improved signal transmission method, and a novel and improved signal transmission system capable of ascertaining states of mounting targets with more versatile and simpler configurations.

Solution to Problem

According to the present disclosure, there is provided a signal transmission device including: a power generation unit configured to generate power in accordance with a surrounding environment; a first communication unit configured to send a signal using the power generated by the power generation unit; a storage unit configured to store communication control information for controlling the first communication unit; a communication control unit configured to control the first communication unit on a basis of the communication control information; and a contactless communication unit configured to receive rewrite information for rewriting the communication control information stored in the storage unit by contactless communication.

In addition, according to the present disclosure, there is provided a signal transmission method including: rewriting communication control information stored in a signal transmission device with rewrite information received by contactless communication; generating power in accordance with a surrounding environment; and sending a signal using the generated power on a basis of the communication control information.

Further, according to the present disclosure, there is provided a signal transmission system including: a signal transmission device including a power generation unit configured to generate power in accordance with a surrounding environment, a first communication unit configured to send a signal using the power generated by the power generation unit, a storage unit configured to store communication control information for controlling the first communication unit, a communication control unit configured to control the first communication unit on a basis of the communication control information, and a contactless communication unit configured to receive rewrite information for rewriting the communication control information stored in the storage unit by contactless communication; and a signal relay device including a relay communication unit configured to receive the signal sent from the first communication unit of the signal transmission device, and a second communication unit configured to wirelessly transmit the received signal.

According to the present disclosure, since the signal transmission device can send a signal using power generated by a built-in power generation device, the signal transmission device can send a signal without including a power source such as a battery. In addition, since a function to be performed can be switched in accordance with control information stored in a built-in storage device, the signal transmission device can perform a plurality of functions when the control information is rewritten from the outside.

Advantageous Effects of Invention

According to the present disclosure, as described above, it is possible to provide a signal transmission system capable of ascertaining a state of a mounting target with a more versatile and simpler configuration.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an explanatory diagram illustrating an example of information stored in a storage unit.

FIG. 9 is an explanatory diagram illustrating an example of information included in a signal sent by a signal sending device.

FIG. 11 is an explanatory diagram illustrating an example of information included in a signal transmitted by the signal relay device.

FIG. 12 is a flowchart for describing an example of an operation in a case in which the signal transmission device functions as a master relay device.

FIG. 13 is an explanatory diagram illustrating an example of information included in a signal transmitted from the master relay device to a network connection device.

MODE(S) FOR CARRYING OUT THE INVENTION

Figure 1:
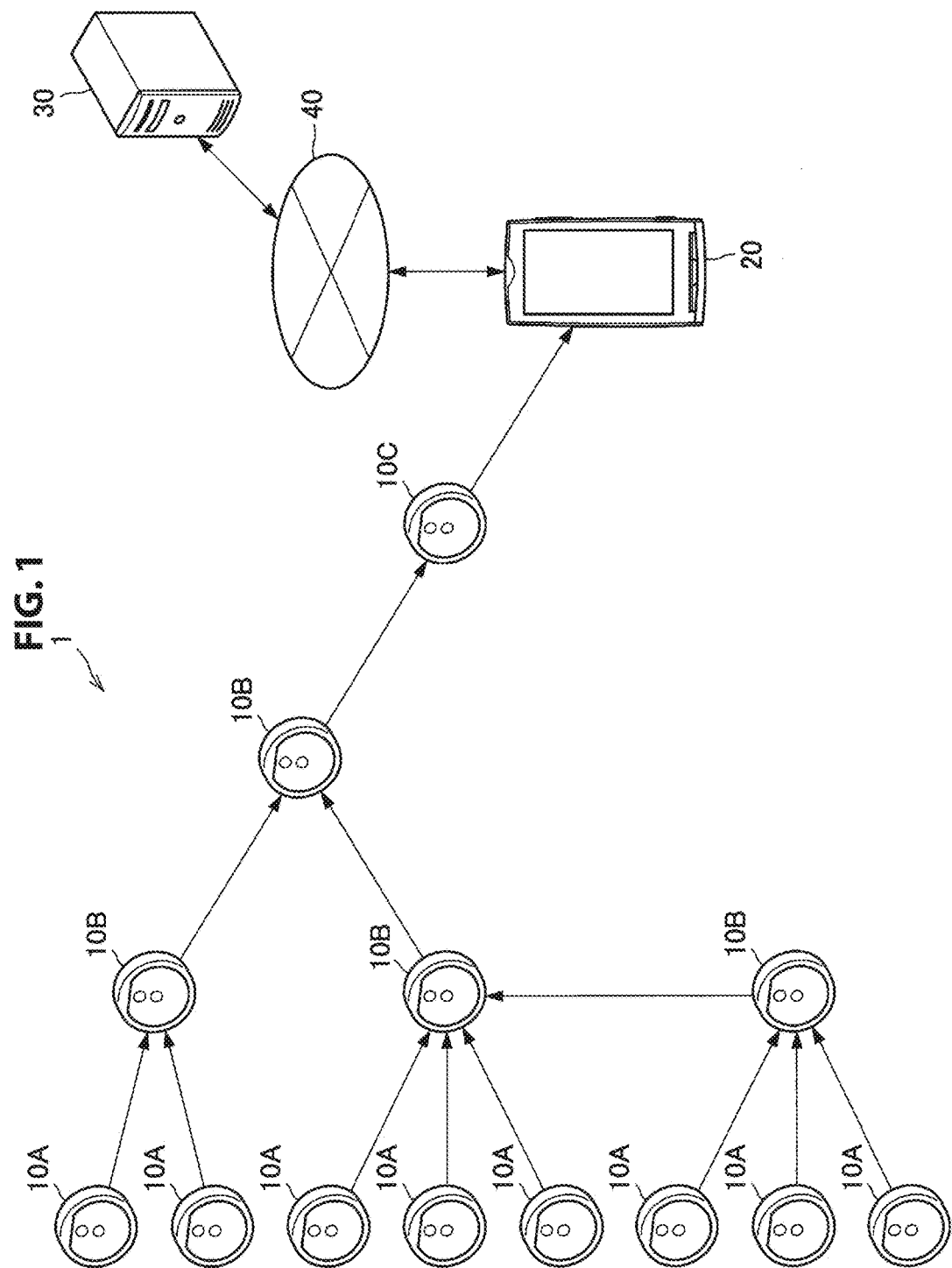
FIG. 1 is an explanatory diagram illustrating an overview of a signal transmission system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Signal transmission system
2. Signal transmission device
2.1. Overview of signal transmission device
2.2. Configuration of signal transmission device
2.3. Operation of signal transmission device
3. Application example of signal transmission system
3.1. First application example
3.2. Second application example
4. Conclusion

1. SIGNAL TRANSMISSION SYSTEM

First, an overview of a signal transmission system according to an embodiment of the present disclosure will be described with reference to FIG. 1. FIG. 1 is an explanatory diagram illustrating an overview of a signal transmission system 1 according to the embodiment of the present disclosure.

As illustrated in FIG. 1, the signal transmission system 1 includes signal sending devices 10A mounted on management targets (for example, domestic animals, humans, or the like (not illustrated); also referred to as mounting targets) which can freely move, and signal relay devices 10B and a master relay device 10C that are fixed at predetermined positions, a network connection device 20 that is connected to the master relay device 10C, and an information processing server 30 that is connected to the network connection device 20 via a communication network 40.

The signal sending device 10A sends a signal at a predetermined timing using power generated by a built-in power generation device. The signal relay device 10B receives a signal sent from the signal sending device 10A and transmits the received signal to the master relay device 10C via another signal relay device 10B or the like. The master relay device 10C receives a signal sent from each signal sending device 10A and transmits the received signal to the information processing server 30 via the network connection device 20 and the communication network 40. Note that either wired connection or wireless connection can be used as the connection between the master relay device 10C and the network connection device 20, and the present disclosure is not particularly limited.

In addition, the network connection device 20 is an information processing device that includes a wired or wireless communication device connected to the communication network 40. For example, the communication device included in the network connection device 20 may be a wired or wireless local area network (LAN)-compatible communication device, a cable communication device that performs wired cable communication, or a communication device that performs wireless mobile communication. For example, the network connection device 20 may be a mobile phone, a smartphone, a gateway server, or the like.

The communication network 40 is a network through which information is transmitted and received. The communication network 40 may be, for example, the Internet, a satellite communication network, a telephone line network, a mobile communication network (for example, a 3G line network or the like), or the like.

The information processing server 30 manages positions or the like of the mounting targets on which the signal sending devices 10A are mounted by performing information processing on signals sent from the signal sending devices 10A. Thus, the information processing server 30 can supply positional information of the mounting targets to a user or the like who manages, monitors, or protects the mounting targets on which the signal sending devices 10A are mounted.

Here, a signal sent from the signal sending device 10A includes identification information of the signal sending device 10A. In addition, the signal relay device 10B receiving a signal sent from the signal sending device 10A assigns identification information of the signal relay device 10B itself to the received signal, and then transmits the signal to another signal relay device 10B. Thus, the signal transmission system 1 can ascertain the signal relay device 10B that has a communicable range in which there is the signal sending device 10A that sends the signal. Accordingly, the signal transmission system 1 according to the embodiment can ascertain the signal sending device 10A having sent the signal and the position of the mounting target on which the signal sending device 10A is mounted on the basis of a position at which the signal relay device 10B having received the signal is installed.

In addition, in the signal transmission system 1 according to the embodiment, different communication schemes or frequencies may be used as a communication scheme from the signal sending device 10A to the signal relay device 10B (also referred to as a first communication scheme) and a communication scheme between the signal relay devices 10B and from the signal relay device 10B to the master relay device 10C (also referred to as a second communication scheme). Thus, the signal relay device 10B can determine whether a received signal is a signal from the signal sending device 10A or a signal from the signal relay device 10B in accordance with the communication schemes or the frequencies.

Further, in the signal transmission system 1 according to the embodiment, the signal sending device 10A, the signal relay device 10B, and the master relay device 10C can be configured with the same hardware. In this case, the signal sending device 10A, the signal relay device 10B, and the master relay device 10C can exhibit separate functions in accordance with control information stored in a built-in storage device. That is, the signal sending device 10A, the signal relay device 10B, and the master relay device 10C can exchange the control information stored in the built-in storage device by rewriting the control information.

Specifically, the signal sending device 10A, the signal relay device 10B, and the master relay device 10C are wireless communication devices capable of transmitting and receiving signals by wireless communication and function as any of the foregoing devices in accordance with whether or not signal transmission and reception processes are performed and a signal transmission destination.

For example, the signal sending device 10A is a wireless communication device capable of only sending a signal. In addition, the signal relay device 10B is a wireless communication device capable of receiving a signal and capable of transmitting the received signal to the subsequent signal relay device 10B. Further, the master relay device 10C is a wireless communication device capable of receiving a signal and capable of transmitting the received signal to the connected network connection device 20.

Accordingly, the signal transmission system 1 according to the embodiment, by controlling operations of wireless communication devices that have the same hardware with the control information, it is possible to cause the wireless communication devices to function as the signal sending device 10A, the signal relay device 10B, and the master relay device 10C. Accordingly, in the signal transmission system 1 according to the embodiment, a transmission route of a signal from the signal sending device 10A to the master relay device 10C can be constructed with the same hardware for which the control information is different. Therefore, it is possible to improve versatility and flexibility of the whole system.

Note that the signal transmission system 1 according to the embodiment is not limited to the foregoing example. The signal sending device 10A, the signal relay device 10B, and the master relay device 10C may be configured with different types of hardware. For example, the signal sending device 10A may be configured with a casing that has a small size and high portability in order to reduce a burden on the management target, and the signal relay device 10B and the master relay device 10C may be configured with casings that can be fixed at predetermined positions. In addition, the signal relay device 10B and the master relay device 10C may have power sources such as secondary cells other than power generation devices or may have input terminals for supplying power from an external power source.

2. SIGNAL TRANSMISSION DEVICE

2.1. Overview of Signal Transmission Device

Figure 2:
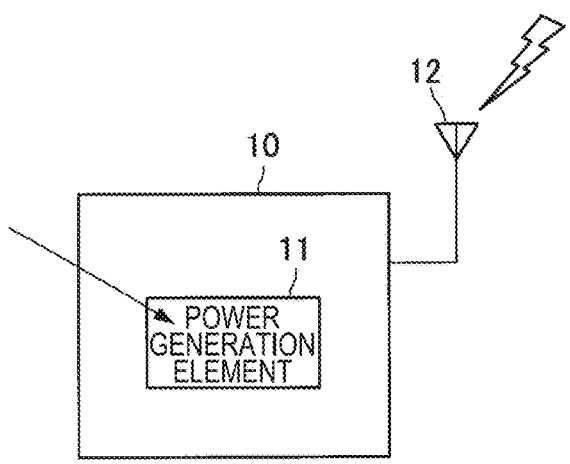
FIG. 2 is an explanatory diagram illustrating an overview of a signal transmission device according to the embodiment.

Next, an overview of the signal transmission device according to the embodiment of the present disclosure will be described with reference to FIG. 2. FIG. 2 is an explanatory diagram illustrating an overview of the signal transmission device 10 according to the embodiment.

Note that the signal sending device 10A, the signal relay device 10B, and the master relay device 10C will be described as devices that have the same hardware and have different pieces of control information stored in the built-in storage devices. Accordingly, in a case in which the configuration of the hardware is described, the signal sending device 10A, the signal relay device 10B, and the master relay device 10C are described collectively as the signal transmission device 10. Here, in a case in which each function is described, the signal sending device 10A, the signal relay device 10B, and the master relay device 10C are described separately.

As illustrated in FIG. 2, the signal transmission device 10 according to the embodiment is a wireless communication device that contains a power generation element 11 and can send a signal from an antenna 12 using power generated by the power generation element 11.

The power generation element 11 is an element capable of generating power in accordance with an environment around the signal transmission device 10. Specifically, the power generation element 11 may be an element that generates power on the basis of at least one of light, heat, vibration, electro waves including a distant electromagnetic field and a near electromagnetic field, and a chimerical reaction of an organic substance, an inorganic substance, or the like. For example, the power generation element 11 may be a photovoltaic element that generates power from indoor light, solar light, or the like, a thermoelectric conversion element that generates power using a temperature difference or heat, an enzyme battery that generates power using sugar, a piezoelectric element that converts a pressure generated by vibration into power, or the like.

The antenna 12 is a communication antenna in conformity with a wireless scheme using an electromagnetic waves or an electric field. For example, the antenna 12 may be an antenna that can perform mobile radio communication such as 3G or Long Term Evolution (LTE) or communication by a wavelength signal with a bandwidth of hundreds of MHz to tens of GHz such as Wi-Fi (registered trademark), ZigBee (registered trademark), Bluetooth (registered trademark), Bluetooth Low Energy (registered trademark), ANT (registered trademark), ANT+ (registered trademark), or EnOcean Alliance (registered trademark). Note that in a case in which the signal transmission device 10 is a wireless communication device capable of transmitting and receiving a signal in accordance with at least two types of communication schemes or frequencies, the two or more types of antennas 12 may be provided in accordance with the communication schemes or frequencies or may be a multi-band antenna corresponding to a plurality of communication schemes or frequencies.

The signal transmission device 10 according to the embodiment can send a signal although a power source such as a battery is not mounted, since power can be generated through power generation by the power generation element 11. Thus, since portability of the signal transmission device 10 can be improved, it is possible to reduce a burden on the mounting target. In addition, since it is not necessary for the signal transmission device 10 to manage lifetime of the power source such as a battery or the like, it is possible to further simplify management of the mounting target.

Note that in a case in which the signal transmission device 10 is used as the signal relay device 10B or the master relay device 10C, the signal transmission device 10 may be installed and fixed to a predetermined position. In this case, since it is not necessary to consider portability, the signal transmission device 10 may includes a secondary cell or may be connected to an external power source. In a case in which the signal transmission device 10 is used as the signal relay device 10B or the master relay device 10C, the signal transmission device 10 is normally in a reception standby state, and thus continuously consumes power. Accordingly, in a case in which the signal transmission device 10 is used as the signal relay device 10B or the master relay device 10C, the signal transmission device 10 preferably includes a power source such as a secondary cell or is connected to an external power source via a plug socket, a plug, or the like so that power can be stably supplied.

Figure 3A:
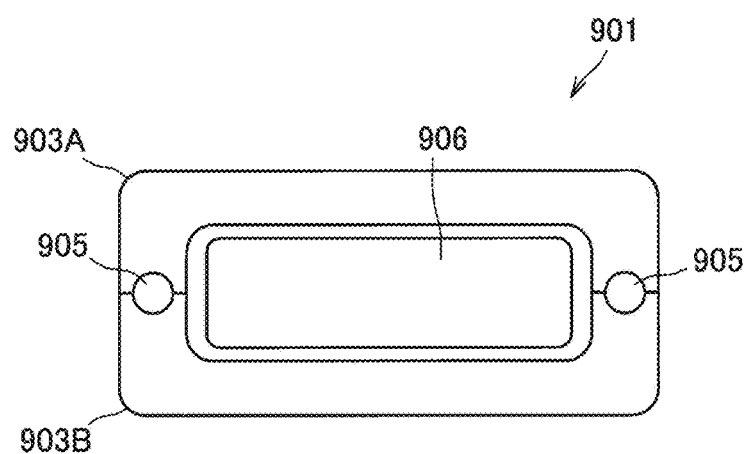
FIG. 3A is a sectional view schematically illustrating a cross-sectional structure of the signal transmission device with a sealing structure.

Here, since at least the signal sending device 10A of the signal transmission devices 10 according to the embodiment is mounted on the mounting target that freely moves outdoors or is installed outdoors, high resistance (for example, a waterproof property, a dustproof property, or the like) to an external environment is requested. Therefore, for example, as illustrated in FIG. 3A, the structure of the signal transmission device 10 is considered to be a sealing structure. FIG. 3A is a sectional view schematically illustrating a cross-sectional structure of the signal transmission device 901 with a sealing structure.

Specifically, as illustrated in FIG. 3A, the signal transmission device 901 has a sealing structure in which a circuit substrate 906 including the storage device is interposed between casings 903A and 903B and joints of the casings 903A and 903B are sealed in O-ring seal members 905. In this structure, since the signal transmission device 901 has no opening in which water, dust, or the like invades into the surfaces of the casings 903A and 903B, it is possible to improve resistance to an external environment.

Figure 3B:
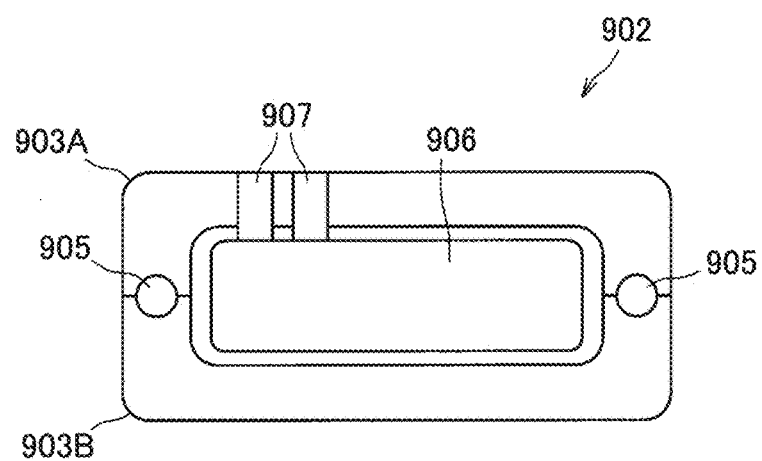
FIG. 3B is a sectional view schematically illustrating a cross-sectional structure of the signal transmission device in which a terminal or the like is provided on a surface.

On the other hand, since the signal transmission device 10 according to the embodiment can change an operation and a function in accordance with the control information stored in the built-in storage device, the signal transmission device 10 is requested to be capable of rewriting information regarding the built-in storage device. Therefore, for example, as illustrated in FIG. 3B, a terminal or the like is considered to be provided on the surface of the casing of the signal transmission device 10 so that information can be input and output. FIG. 3B is a sectional view schematically illustrating a cross-sectional structure of a signal transmission device 902 in which a terminal or the like is provided on a surface.

Specifically, as illustrated in FIG. 3B, the signal transmission device 902 has a structure in which the circuit substrate 906 including the storage device is interposed between casings 903A and 903B and O-ring seal members 905 are provided between the casings 903A and 903B. In addition, openings are provided in the casing 903A and terminals 907 are provided in the openings. In this structure, since the signal transmission device 902 can input and output information to and from the outside via the terminals 907, it is possible to rewrite the control information or the like stored in the built-in storage device from the outside.

However, the structures illustrated in FIGS. 3A and 3B may not be compatible in terms of whether or not the openings are provided in the casing of the signal transmission device 10. In addition, in a case in which the terminals are provided in the casing of the signal transmission device 10, it is also necessary to take countermeasures against static electricity. Accordingly, in the structures illustrated in FIGS. 3A and 3B, it was difficult to satisfy characteristics requested in at least the signal sending device 10A among the signal transmission devices 10 according to the embodiment.

Figure 4:
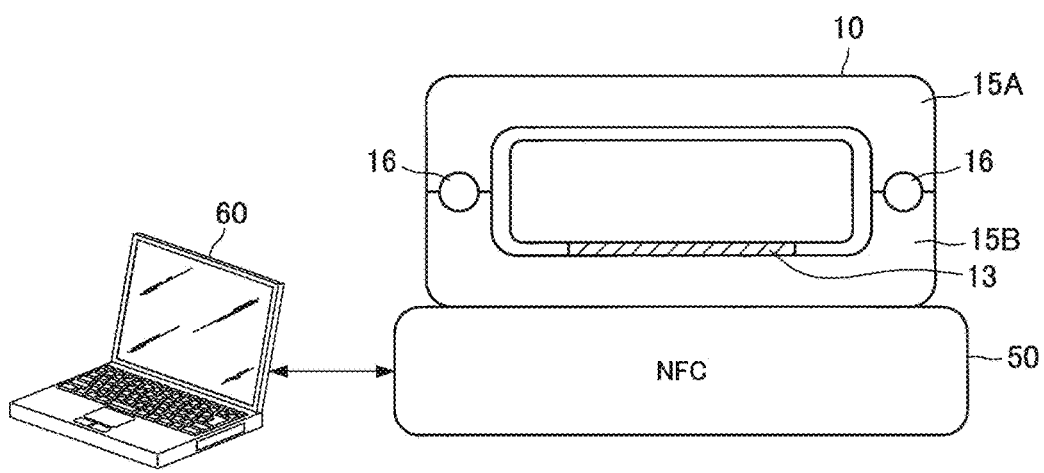
FIG. 4 is an explanatory diagram illustrating a cross-sectional structure of the signal transmission device according to the embodiment.
Figure 5:
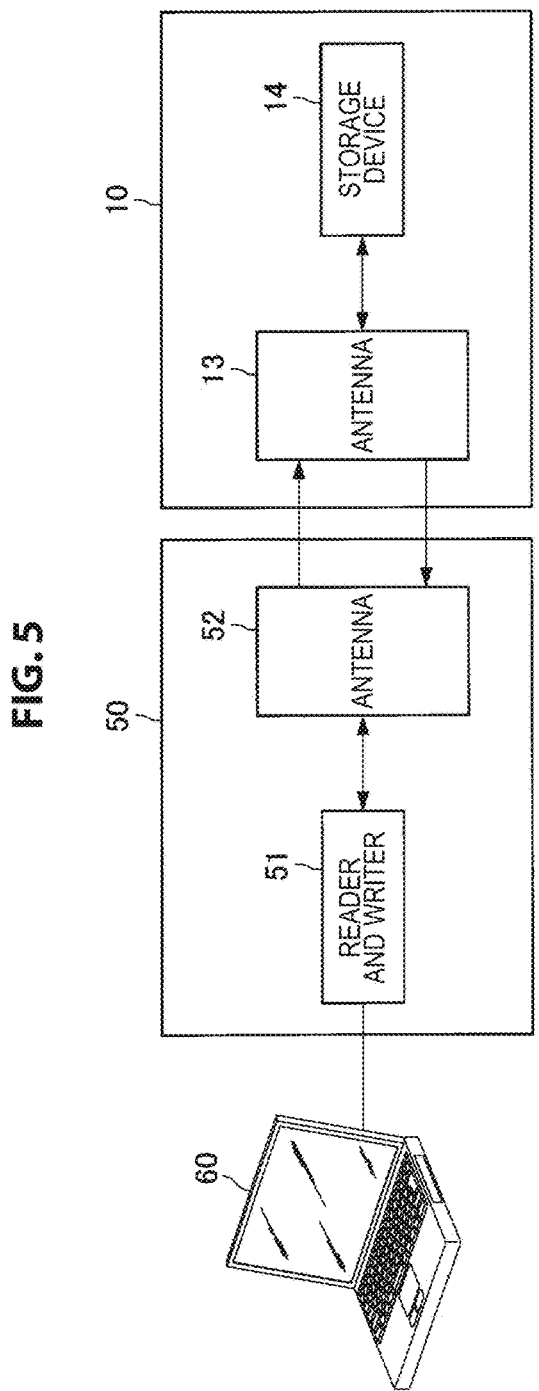
FIG. 5 is an explanatory diagram illustrating a configuration of the signal transmission device with regard to contactless communication.

Accordingly, the signal transmission device 10 according to the embodiment can achieve characteristics required as the signal sending device 10A by containing the contactless communication antenna 13 while having a sealing structure of the casing so that information can be input and output to and from the outside by contactless communication, as illustrated in FIGS. 4 and 5. FIG. 4 is an explanatory diagram illustrating a cross-sectional structure of the signal transmission device 10 according to the embodiment. FIG. 5 is an explanatory diagram illustrating a configuration of the signal transmission device 10 with regard to contactless communication.

Specifically, as illustrated in FIG. 4, the signal transmission device 10 includes a contactless communication antenna 13 inside the casings 15A and 15B. In addition, the casings 15A and 15B of the signal transmission device 10 has a structure sealed with the O-ring seal members 16 without having an opening for exposing a communication terminal for connection with an external device. In addition, a memory (storage device) and a control circuit that controls each configuration of the above-described power generation elements 11, antenna 12, and signal transmission device 10 are accommodated inside the casings 15A and 15B of the signal transmission device 10.

The signal transmission device 10 is mounted on management targets such as a domestic animal or a human. Therefore, the casings 15A and 15B may include a mounting mechanism (for example, a pin, clip, or an attach surface, or the like) for a management target. Here, the casings 15A and 15B may not include the mounting mechanism. In this case, the signal transmission device 10 may be mounted on a management target via different structures (for example, a cover, a mount, or the like) from the casings 15A and 15B or may be mounted on a management target to be contained in a biological body of a management target.

The signal transmission device 10 can receive information from an information processing device 60 such as an external personal computer by approaching the contactless communication antenna 13 to a contactless communication device 50 and can rewrite information stored in the storage device included inside the casings 15A and 15B. Since the contactless communication is wireless communication in which wired connection via a terminal or the like is not necessary, it is possible to maintain the sealing structure of the casings 15A and 15B of the signal transmission device 10.

More specifically, as illustrated in FIG. 5, the signal transmission device 10 includes a built-in storage device 14 and the contactless communication antenna 13. In addition, the contactless communication device 50 includes a reader and writer 51 and a contactless communication antenna 52. The contactless communication device 50 can transmit information input from the connected information processing device 60 to the signal transmission device 10 by contactless communication.

The contactless communication is a wireless communication scheme performed between the signal sending device 10A and the signal relay device 10B and a communication scheme in which at least a communicable distance is shorter than in a wireless communication scheme performed between the signal relay device 10B and the master relay device 10C. Specifically, the contactless communication is a communication scheme in which communication can be performed in a range of about a few cm to a few m. As specific examples of the contactless communication, various communication schemes used in the radio frequency identifier (RFID) can be exemplified. For example, the near field communication (NFC) such as FeliCa (registered trademark) in which a near electromagnetic field is used can be exemplified.

In the contactless communication, signal is transmitted to the signal transmission device 10 by transmitting a carrier wave from the antenna 52 of the contactless communication device 50 to the antenna 13 of the signal transmission device 10, and supplying power to the signal transmission device 10 through electromagnetic induction and further modulating the carrier wave. In the contactless communication, power is supplied from the contactless communication device 50 to the signal transmission device 10 and then communication is performed. Therefore, even when the signal transmission device 10 does not include a power source such as a battery, communication can be performed.

In addition, since the contactless communication is a communication scheme in which communication is possible only in a near distance of about a few cm to a few m between the antenna 52 and the antenna 13, it is easy to specify the signal transmission device 10 rewriting information unlike other wireless communication schemes. Here, the storage device 14 of the signal transmission device 10 stores each unique identification information and control information for exhibiting each separate function. Therefore, in order to avoid unintended rewriting of information stored in the storage device 14 of the signal transmission device 10, information is preferably written by contactless communication in which it is easy to specify the signal transmission device 10.

Further, since the contactless communication is a communication scheme in which communication is possible only in a near distance of about a few cm to a few m between the antenna 52 and the antenna 13, it is necessary to approach the signal transmission device 10 up to about a few cm in order to perform communication. Accordingly, by using the contactless communication, the signal transmission device 10 can lower a possibility of rewriting information illegally through remote connection from the outside.

Note that examples of information written on the storage device 14 of the signal transmission device 10 by the contactless communication includes identification information unique to the signal transmission device 10, control information for determining whether or not the signal transmission device 10 performs processes of transmitting and receiving signals, and setting information such as a format of a signal transmitted from the signal transmission device 10. For example, the information may be stored in the storage device 14 with a format such as a text string. In addition, the signal transmission device 10 can also update a control program by receiving an updating program of the control program controlling the signal transmission device 10 by the contactless communication.

In the foregoing configuration, the signal transmission device 10 according to the embodiment can switch an operation such as an operation to perform or not to perform a process of transmitting or receiving signals, although the signal transmission device 10 does not include a switch, a contact, a terminal, or the like. Accordingly, the signal transmission device 10 can perform various functions of the signal sending device 10A, the signal relay device 10B, the master relay device 10C, and the like in the signal transmission system 1 according to the embodiment. Further, the signal transmission device 10 can also update a control program (so-called firmware) of the signal transmission device 10 without being physically connected to an internal circuit substrate.

Note that FIG. 4 illustrates the structure in which the antenna 13 is provided on one surface side of the signal transmission device 10, but the signal transmission device 10 according to the embodiment is not limited to the structure illustrated in FIG. 4. For example, the signal transmission device 10 may include the plurality of contactless communication antennas 13 or the antenna 13 may be formed on each of a plurality of surface sides (for example, both surfaces).

2.2. Configuration of Signal Transmission Device

Figure 6:
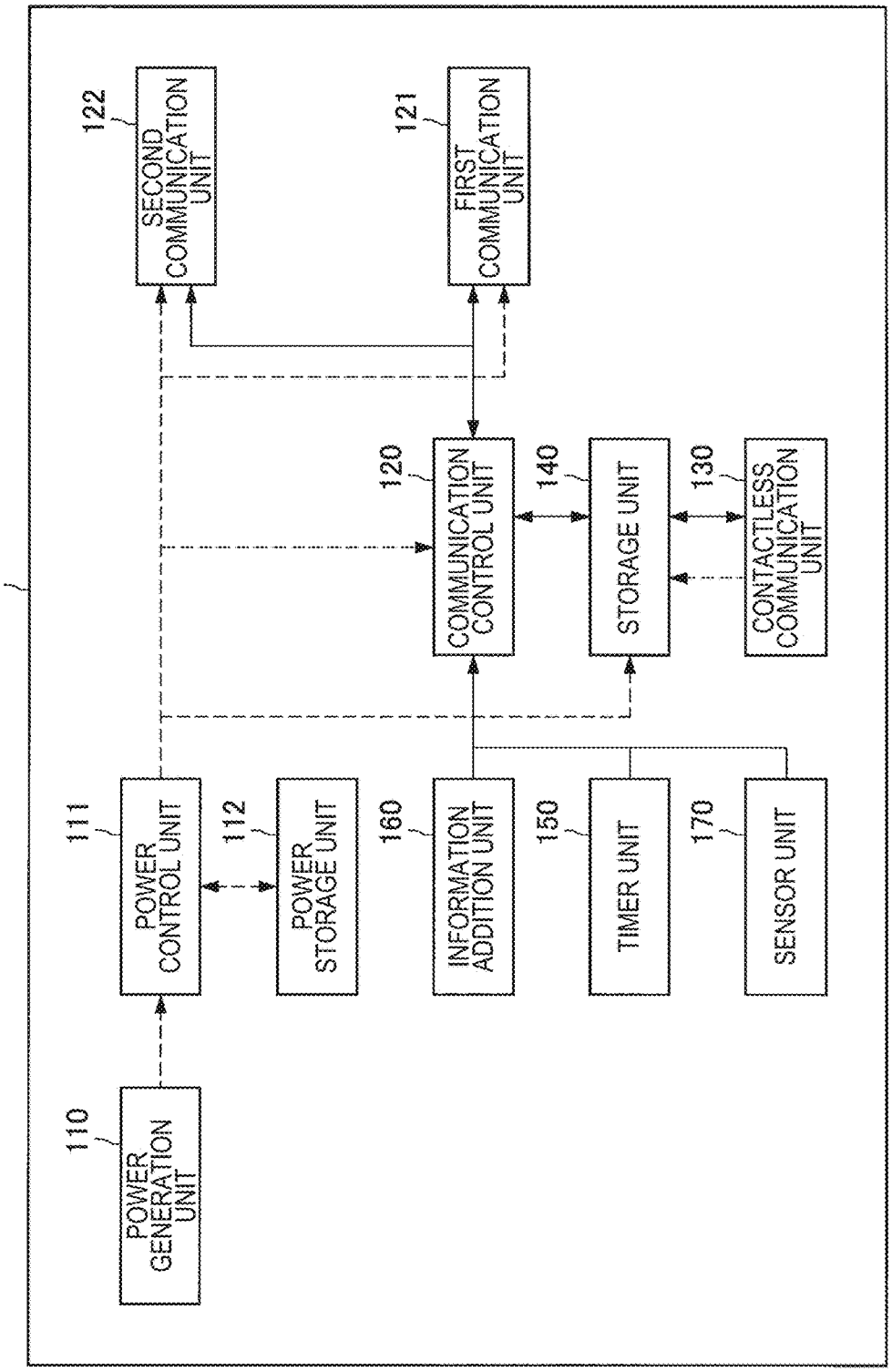
FIG. 6 is a block diagram illustrating a functional configuration of the signal transmission device according to the embodiment.

Next, a specific configuration of the signal transmission device 10 according to the embodiment will be described with reference to FIG. 6. FIG. 6 is a block diagram illustrating a functional configuration of the signal transmission device 10 according to the embodiment. Note that a solid line indicates connection of each configuration by information and a broken line indicates connection of each configuration by power in FIG. 6.

As illustrated in FIG. 6, the signal transmission device 10 includes a power generation unit 110, a power control unit 111, a power storage unit 112, a communication control unit 120, a first communication unit 121, a second communication unit 122, a contactless communication unit 130, a storage unit 140, a timer unit 150, an information addition unit 160, and a sensor unit 170.

The power generation unit 110, the power control unit 111, the power storage unit 112, the communication control unit 120, the first communication unit 121, the second communication unit 122, the contactless communication unit 130, the storage unit 140, the timer unit 150, the information addition unit 160, and the sensor unit 170 are accommodated, for example, inside the casings 15A and 15B of the signal transmission device 10 illustrated in FIG. 4.

The power generation unit 110 is a power generation device capable of generating power in accordance with an environment around the signal transmission device 10. Specifically, the power generation unit 110 may be one device or a plurality of devices among various power generation devices such as a vibration power generation device, a photovoltaic generation device, a thermoelectric conversion power generation device, an enzyme power generation device, a power generation device using radio waves, and a power generation device using a near electromagnetic field.

For example, a vibration power generation device is a power generation device that includes an electrostatic type, electromagnetic type, magnetostrictive type of power generation element and generates power using vibration. The photovoltaic generation device is a power generation device that includes a silicon-based photovoltaic generation element, a compound semiconductor-based photovoltaic generation element, or a dye-sensitized photovoltaic generation element and generates power using solar light or indoor light. The thermoelectric conversion power generation device is a power generation device that includes a power generation element using the Seebeck effect or a Thomson effect, a thermoelectronic power generation element, or a thermomagnetic power generation element and generates power using heat, a temperature difference, or the like. The enzyme power generation device is a power generation device that generates power by decomposing carbohydrate (for example, glucose or the like) contained in an organic substance by an enzyme. The power generation device using radio waves is a power generation device that generates power using radio waves such as Wi-Fi or terrestrial digital waves and the power generation device using a near electromagnetic field is power generation device that generates power using electromagnetic waves of a near electric field.

The power generation unit 110 is the foregoing power generation device, and thus the signal transmission device 10 can send a signal even when a power source is not mounted. Note that power generated by the power generation unit 110 can be stored in the power storage unit 112 to be described below.

The power control unit 111 controls supply of power to the first communication unit 121 and the second communication unit 122. Specifically, the power control unit 111 causes the power storage unit 112 to store the power generated by the power generation unit 110. In a case in which the power stored in the power storage unit 112 reaches a predetermined amount, the power stored in the power storage unit 112 is supplied to the first communication unit 121 or the second communication unit 122. Accordingly, in a case in which the signal transmission device 10 functions as the signal sending device 10A, the signal transmission device 10 can send a signal from the first communication unit 121 when an integrated value of the power generated by the power generation unit 110 reaches a predetermined amount. The power control unit 111 may be an integrated circuit that includes various circuits such as a switching element such as a transistor, a power control integrated circuit (IC), and a regulator circuit.

Note that in a case in which the signal transmission device 10 functions as the signal relay device 10B or the master relay device 10C, the signal transmission device 10 sends a signal received from the second communication unit 122 when a signal is received from the first communication unit 121. At this time, the power control unit 111 may supply power supplied from a separately mounted secondary cell or an external power source to the second communication unit 122 or may supply power stored in the power storage unit 112 to the second communication unit 122.

The power storage unit 112 stores the power generated by the power generation unit 110. The power stored in the power storage unit 112 is used to operate the first communication unit 121 and the second communication unit 122. The power storage unit 112 may be any one or a combination of a plurality of various secondary cells such as a lithium ion secondary cell, various capacitors such as an electric double layer capacitor and a lithium ion capacitor, and various capacitors such as a ceramic capacitor, a film capacitor, an aluminum electrolytic capacitor, and a tantalum capacitor.

In addition, the power storage unit 112 may convert the power generated by the power generation unit 110 into mechanical energy, heat energy, or light energy, the like other than electric energy to store it. In this case, the power control unit 111 may include an energy conversion mechanism that converts electric energy into another type of energy and the power storage unit 112 may be a power storage device, a heat storage device, or a light storage device that stores the other converted energy.

The first communication unit 121 includes a communication circuit and an antenna, and transmits and receives signals in conformity with the first communication scheme. The first communication unit 121 may include a communication circuit and an antenna that can perform mobile radio communication such as 3G or Long Term Evolution (LTE) or communication by a wavelength signal with a bandwidth of hundreds of MHz to tens of GHz (for example, 920 MHz or the like) such as Wi-Fi, ZigBee, Bluetooth, Bluetooth Low Energy, ANT, ANT+, or EnOcean Alliance. Specifically, the first communication unit 121 may include a communication circuit and an antenna for Bluetooth Low Energy.

The first communication scheme may be a communication scheme in which a communicable distance is relatively short (for example, a communication distance is shorter than in the second communication scheme to be described below). In the signal transmission system 1 according to the embodiment, the positions of the signal sending device 10A and a mounting target on which the signal sending device 10A is mounted are ascertained using the signal relay device 10B receiving a signal sent by the first communication unit 121. Therefore, in a case in which the communicable distance of the first communication scheme performed by the first communication unit 121 is relatively short, it is possible to ascertain the positions of the signal sending device 10A and the mounting target with higher resolution.

The timer unit 150 is an analog or digital time counter and measures a time. Specifically, the timer unit 150 is time counter in which an integrated value is reset whenever the first communication unit 121 sends a signal and measures a time elapsed after the first communication unit 121 sends the signal. Note that in a case in which the signal transmission device 10 operates with only power generated by the power generation unit 110, the signal transmission device 10 enters a conductive state when the first communication unit 121 sends the signal, and enters a non-conductive state after the signal is sent. Therefore, the timer unit 150 is preferably an analog time counter capable of measuring an elapsed time even in the non-conductive state.

The sensor unit 170 is any of various sensors that measure a state of the mounting target on which the signal sending device 10A is mounted and a surrounding environment state. Measurement information measured by any of the various sensors of the sensor unit 170 is output to the communication control unit 120 to be added to a signal to be sent by the first communication unit 121. Thus, the signal transmission system 1 can ascertain not only the position of the mounting target on which the signal sending device 10A is mounted but also the mounting target or a state around the mounting target simultaneously in accordance with the signal from the signal sending device 10A.

The sensor unit 170 may be any of various sensors that measure a surrounding environment state, such as a temperature sensor, a humidity sensor, an atmospheric pressure sensor, an illuminance sensor, a gas sensor, an acceleration sensor, a vibration sensor such as acceleration and gyro sensors a geomagnetic sensor, a microphone, and an imaging device. In addition, the sensor unit 170 may be any of various sensors that measure a state of a mounting target, such as a body temperature sensor, a heart rate sensor, a blood sugar sensor, and a blood pressure sensor. Further, the sensor unit 170 may a combination of a plurality of various sensors described above.

The second communication unit 122 includes a communication circuit and an antenna, and transmits and receives signals in conformity with the second communication scheme. The second communication unit 122 may include a communication circuit and an antenna that can perform mobile radio communication such as 3G or Long Term Evolution (LTE) or communication by a wavelength signal with a bandwidth of hundreds of MHz to tens of GHz (for example, 920 MHz or the like) such as Wi-Fi, ZigBee, Bluetooth, Bluetooth Low Energy, ANT, ANT+, or EnOcean Alliance. Specifically, the second communication unit 122 may include a communication circuit and an antenna for the communication scheme using a wavelength signal of 920 MHz.

The communication circuit and the antenna included in the second communication unit 122 may be different from or the same as the communication circuit and the antenna included in the first communication unit 121. For example, the communication circuit included in the second communication unit 122 may be an electronic component or a common IC to the communication circuit included in the first communication unit 121, or the antenna included in the second communication unit 122 may be a common multi-band antenna to the antenna included in the first communication unit 121

The communication scheme or the frequency of the second communication scheme performed by the second communication unit 122 may be different from that of the first communication scheme. Thus, the second communication unit 122 can prevent a sent signal from being crossed with a signal sent by the first communication unit 121.

In addition, the second communication scheme performed by the second communication unit 122 preferably has a longer communicable distance than the first communication scheme. In a case in which the communicable distance of the second communication scheme is longer than that of the first communication scheme, the signal transmission device 10 can relay a signal sent from the signal sending device 10A to the master relay device 10C more efficiently as the signal relay device 10B.

The communication control unit 120 controls transmission and reception of a signal by the first communication unit 121 and the second communication unit 122 on the basis of the communication control information stored in the storage unit 140. The communication control unit 120 may include an arithmetic processing device such as a micro processing unit (MPU) or a central processing unit (CPU) and memories such as a read-only memory (ROM) and a random access memory (RAM).

Specifically, in a case in which the signal transmission device 10 functions as the signal sending device 10A, the communication control unit 120 controls the first communication unit 121 such that a signal including the identification information of the signal transmission device 10 is sent using with a predetermined amount of power stored in the power storage unit 112. That is, in a case in which the power stored in the power storage unit 112 reaches the predetermined amount, the communication control unit 120 reads the communication control information from the storage unit 140 by allowing the power stored in the power storage unit 112 to be conductive to the storage unit 140 and controls the first communication unit 121 such that the signal including the identification information of the signal transmission device 10 is sent, on the basis of the read communication control information.

Note that the power stored in the power storage unit 112 is consumed once when the first communication unit 121 sends a signal, but the power can be stored again over time through power generation by the power generation unit 110. Therefore, the communication control unit 120 may control the first communication unit 121 such that a signal is sent whenever the power stored in the power storage unit 112 reaches the predetermined amount.

In addition, in a case in which the signal transmission device 10 functions as the signal relay device 10B or the master relay device 10C, the communication control unit 120 controls the first communication unit 121 such that a signal sent from the first communication unit 121 of another signal transmission device 10 is received.

In addition, in a case in which the signal transmission device 10 functions as the signal relay device 10B or the master relay device 10C, the communication control unit 120 controls the second communication unit 122 such that a signal transmitted from the second communication unit 122 of the signal transmission device 10 (that is, the signal relay device 10B or the master relay device 10C) is received. In addition, the communication control unit 120 controls the second communication unit 122 such that a signal from the signal transmission device 10 (that is, the signal sending device 10A) received by the first communication unit 121 is transmitted to the subsequent signal relay device 10B or the master relay device 10C. Further, the communication control unit 120 controls the second communication unit 122 such that only a signal in which the identification information included in the signal matches the identification information of the signal transmission device 10 itself is transmitted to the subsequent signal relay device 10B or the master relay device 10C among signals from the signal transmission devices 10 (that is, the signal relay devices 10B or the master relay device 10C) received by the second communication unit 122. Note that in a case in which the signal transmission device 10 functions as the signal sending device 10A, the communication control unit 120 controls the second communication unit 122 such that transmission and reception are not performed.

Here, in a case in which the signal transmission device 10 functions as the signal sending device 10A, the communication control unit 120 may adjust a signal sending interval of the first communication unit 121 on the basis of a time measured by the timer unit 150. For example, in a case in which the power is actively generated by the power generation unit 110, there is a possibility of the power stored in the power storage unit 112 reading the predetermined amount for a short time (for example, less than 1 second). In this case, when a signal is frequently sent from the first communication unit 121, a processing load of each device of the signal transmission system 1 may increase and thus there is a possibility of a processing performance of the signal transmission system 1 deteriorating. Therefore, in a case in which a threshold is provided at interval at which the first communication unit 121 sends a signal and a time equal to or greater than the threshold has passed after the first communication unit 121 sends the signal, the communication control unit 120 permits the first communication unit 121 to send a signal. The threshold of the interval at which the first communication unit 121 sends the signal can be appropriately set. For example, about 10 seconds, 20 seconds, or 30 seconds may be used. For example, the foregoing threshold may be set in the communication control information stored in the storage unit 140.

The information addition unit 160 adds information to a signal received by the first communication unit 121 or the second communication unit 122. Specifically, in a case in which the signal transmission device 10 functions as the signal relay device 10B, the information addition unit 160 adds the identification information of the signal transmission device 10 receiving the signal (that is, the signal relay device 10B) to the signal received by the first communication unit 121. Thus, in the signal transmission system 1, the signal transmission device 10 (that is, the signal relay device 10B) receiving the signal sent by the first communication unit 121 of the signal sending device 10A can be specified. Since the signal transmission device 10 functioning as the signal relay device 10B is installed and fixed to the predetermined position and thus the position of the signal transmission device 10 is known, the signal transmission system 1 can ascertain the position of the signal sending device 10A from the position of the signal relay device 10B. On the other hand, in a case in which the signal transmission device 10 functions as the signal sending device 10A, the information addition unit 160 does not particularly perform a function.

Note that the information addition unit 160 may include an arithmetic processing device such as an MPU or a CPU and memories such as a ROM and a RAM.

In addition, the information addition unit 160 may further add information regarding a radio wave intensity of a received signal to a signal sent by the first communication unit 121 of another signal transmission device 10. Thus, since a distance between the signal sending device 10A sending a signal and the signal relay device 10B receiving the signal can be estimated from a radio wave intensity of the signal, the position of the signal sending device 10A can be ascertained more accurately. Note that information regarding the radio wave intensity of the received signal may have 3 stages of, for example, "strong," "normal," and "weak."

In addition, the information addition unit 160 may add the identification information of the signal transmission device 10 (that is, the signal relay device 10B) which is a subsequent reception destination to a signal received by the first communication unit 121. For example, the signal sent from the signal sending device 10A is relayed by the plurality of signal relay devices 10B and is transmitted to the master relay device 10C, it is preferable to specify a transmission route of the signal in each signal relay device 10B so that crossing does not occur. Thus, the information addition unit 160 can specify the transmission route of the signal by adding the identification information of the signal transmission device 10 (that is, the second signal relay device 10B) which is the subsequent reception destination of the signal to the signal. Thus, in the signal transmission system 1, since the signal sent from the signal sending device 10A can be relayed by the plurality of signal relay devices 10B and can be transmitted to the master relay device 10C, the position of the signal sending device 10A in a broader region can be ascertained.

Further, in a case in which the signal transmission device 10 functions as the second or subsequent signal relay device 10B, the information addition unit 160 may update the identification information of the signal transmission device 10 which is a subsequent reception destination included in the received signal. Thus, since the information addition unit 160 can designate the signal transmission device 10 which is a subsequent reception destination, the signal can be relayed at a longer distance to be transmitted to the master relay device 10C by repeating the relay of the signal.

The contactless communication unit 130 receives rewrite information for rewriting the communication control information stored in the storage unit 140 by the contactless communication. Note that the communication control information is information used when the communication control unit 120 controls transmission and reception of the first communication unit 121 and the second communication unit 122. For example, the contactless communication unit 130 may communicate with the outside in conformity with NFC or a communication scheme used for RFID to acquire rewrite information for rewriting the communication control information stored in the storage unit 140. In this case, the contactless communication unit 130 includes, for example, an antenna and a communication circuit corresponding to NFC or the communication scheme used for RFID.

Specifically, the contactless communication unit 130 rewrites the communication control information stored in the storage unit 140 with the received rewrite information by receiving the rewrite information by the contactless communication and further allowing the power supplied with the received carrier wave to be conductive to the storage unit 140. Because of the contactless communication unit 130, the signal transmission device 10 can rewrite the communication control information stored in the built-in storage unit 140 and the control program or the like of the signal transmission device 10 even when a switch, a contact, a terminal or the like is not provided in the casing.

The storage unit 140 stores the communication control information used to control transmission and reception of a signal of the signal transmission device 10. Specifically, the storage unit 140 may store, as the communication control information, the identification information unique to the signal transmission device 10, information used for the signal transmission device 10 to control whether or not to perform a process of transmitting and receiving a signal, and information or the like regarding various kinds of setting of the signal transmission device 10. Note that the storage unit 140 includes a nonvolatile memory. As the nonvolatile memory, for example, a flash memory, a ferroelectric random access memory (FeRAM), a magnetic random access memory (MRAM), a phase change random access memory (PCRAM), or the like can be used.

Note that in the storage unit 140, a reading operation or a rewriting operation for stored information is performed by allowing power generated by the power generation unit 110 and power transferred from the outside in the contactless communication unit 130 to be conductive to the storage unit 140. Specifically, by allowing the power generated by the power generation unit 110 and stored in the power storage unit 112 to be conductive to the storage unit 140, the communication control information stored in the storage unit 140 is read. The read communication control information is used for the communication control unit 120 to control the first communication unit 121 and the second communication unit 122. In addition, by allowing power transferred with the carrier wave received by the contactless communication unit 130 to be conductive to the storage unit 140, it is possible to rewrite the communication control information stored in the storage unit 140 with the rewrite information received by the contactless communication unit 130.

For example, the storage unit 140 may store information regarding each item illustrated in FIG. 7. FIG. 7 is an explanatory diagram illustrating an example of information stored in the storage unit 140.

As illustrated in FIG. 7, for example, the storage unit 140 may store hardware version information of the signal transmission device 10 or may store software (that is, firmware) version information of the signal transmission device 10. In addition, the storage unit 140 may store the identification information unique to the signal transmission device 10.

In addition, the storage unit 140 may store "0" or "1" as reception control information indicating whether or not the signal transmission device 10 performs a signal reception process or may store "0" or "1" as transmission control information indicating whether or not the signal transmission device 10 performs a signal transmission process. Note that this control information is equivalent to the communication control information, "0" indicates that a function is turned off, and "1" indicates that a function is turned on.

Note that it is needless to say that the reception control information and the transmission control information may be stored in the storage unit 140 with a format other than the foregoing format. For example, the reception control information is information indicating a target on which a reception process is performed and may be information indicating one of "only the first communication unit 121 performs the reception process," "only the second communication unit 122 performs the reception process," "both the first communication unit 121 and the second communication unit 122 perform the reception process," and "both the first communication unit 121 and the second communication unit 122 do not perform the reception device." In addition, the transmission control information is information indicating a target on which a transmission process is performed and may be information indicating one of "only the first communication unit 121 performs the reception process," "only the second communication unit 122 performs the reception process," "both the first communication unit 121 and the second communication unit 122 perform the reception process," and "both the first communication unit 121 and the second communication unit 122 do not perform the reception device."

Further, the storage unit 140 may store destination information which is used in a case in which the signal transmission device 10 functions as the signal relay device 10B. The destination information is information indicating the signal relay device 10B serving as a subsequent reception destination of a signal transmitted from the signal relay device 10B, and specifically includes the identification information of the signal relay device 10B serving as the reception destination. The signal relay device 10B or the master relay device 10C that has the identification information matching the identification information included in the destination information transmits the received signal in conformity with the second communication scheme to the network connection device 20 or the signal relay device 10B serving as the subsequent destination.

2.3. Operation of Signal Transmission System

Next, an operation of each device in the signal transmission system 1 according to the embodiment will be described with reference to FIGS. 8 to 13.

Figure 8:
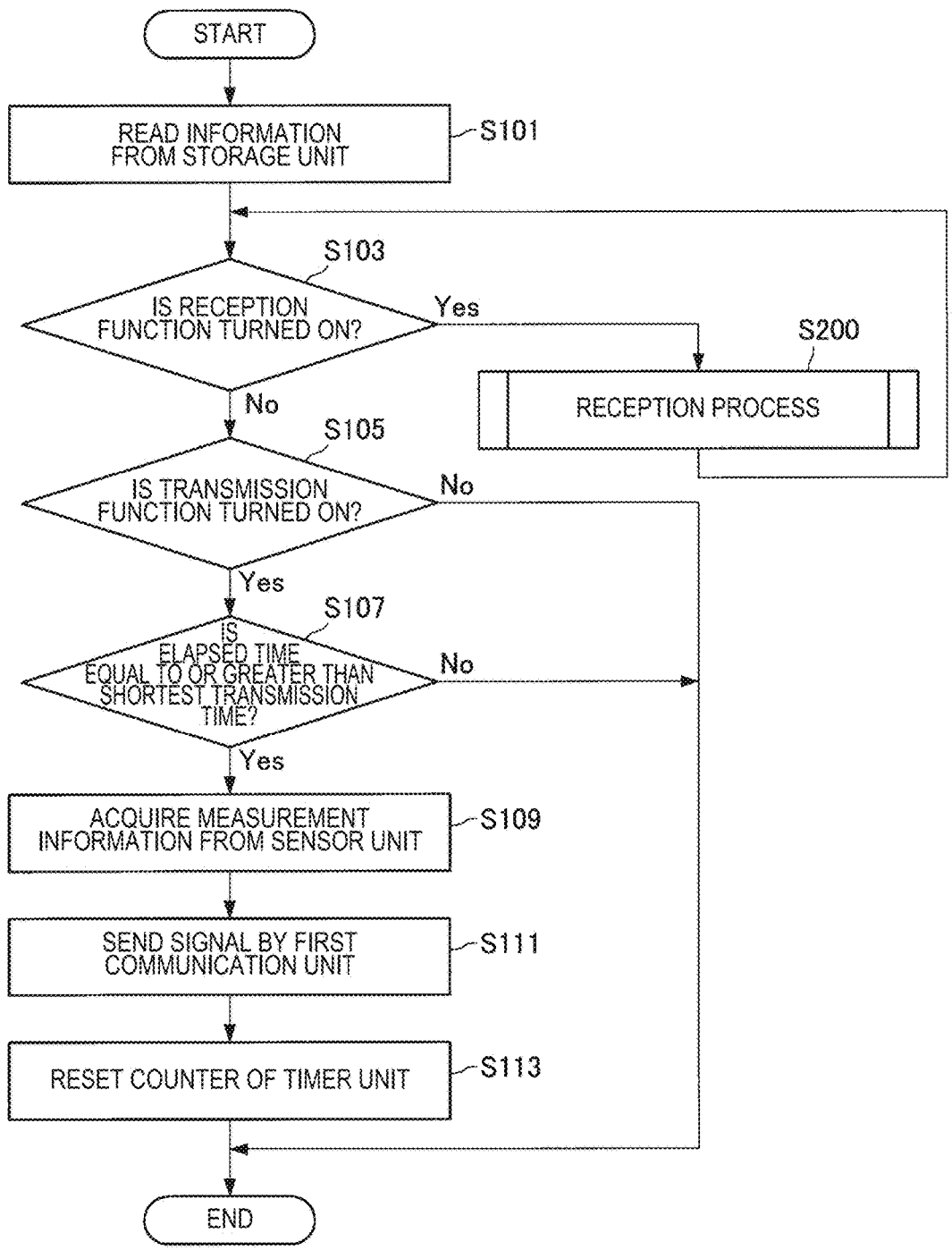
FIG. 8 is a flowchart for describing an example of a basic operation of the signal transmission device.

First, a basic operation of the signal transmission device 10 will be described with reference to FIGS. 8 and 9. FIG. 8 is a flowchart for describing an example of the basic operation of the signal transmission device 10. FIG. 9 is an explanatory diagram illustrating an example of information included in a signal sent by the signal sending device 10A.

As illustrated in FIG. 8, the signal transmission device 10 is first activated with the power stored in the power storage unit 112 or the power from an external power source. Specifically, the power control unit 111 supplies the power stored in the power storage unit 112 to the communication control unit 120 and the storage unit 140. Thereafter, the communication control unit 120 reads the communication control information from the storage unit 140 using the supplied power (S101). Note that the power control unit 111 may supply the power to the storage unit 140 via the communication control unit 120.

Subsequently, on the basis of the read communication control information, the communication control unit 120 determines whether or not a reception function of each of the first communication unit 121 and the second communication unit 122 is turned on (S103). In a case in which the reception function of at least one of the first communication unit 121 and the second communication unit 122 is turned on (Yes in S103), the communication control unit 120 causes the first communication unit 121 or the second communication unit 122 to transition to a reception standby state and performs a reception process (S200). At this time, the signal transmission device 10 functions as the signal relay device 10B or the master relay device 10C.

Conversely, when the reception functions of the first communication unit 121 and the second communication unit 122 are turned off (No in S103), the communication control unit 120 determines whether or not a transmission function of the first communication unit 121 is turned on the basis of the read communication control information (S105). When the transmission function of the first communication unit 121 is turned on (Yes in S103), the communication control unit 120 determines whether or not a time measured by the timer unit 150 is equal to or greater than as threshold set as a shortest transmission time (S105). In a case in which a time equal to or greater than the shortest transmission time has elapsed (Yes in S105), the communication control unit 120 acquires various kinds of measurement information from the sensor unit 170 (S109) and controls the first communication unit 121 such that a signal including the identification information of the signal transmission device 10 and the acquired various kinds of measurement information is sent (S111). Thereafter, the communication control unit 120 resets the counter of the timer unit 150 and causes time measurement to start from the sending of the signal (S113). At this time, the signal transmission device 10 functions as the signal sending device 10A. Conversely, in a case in which the time equal to or greater than the shortest transmission time has not elapsed from the previous signal sending (No in S105), the communication control unit 120 ends the operation and does not send a signal from the first communication unit 121.

Note that in a case in which the transmission function of the first communication unit 121 is turned on (Yes in S103) and a case in which a transmission function of the second communication unit 122 is turned off, the signal transmission device 10 functions as the signal sending device 10A and performs the above-described operation. In the case in which the transmission function of the first communication unit 121 is turned on (Yes in S103) and a case in which the transmission function of the second communication unit 122 is turned on, the signal transmission device 10 functions as the signal sending device 10A and the signal relay device 10B and performs the above-described operation and an operation to be described below in FIG. 10. In a case in which the transmission function of the first communication unit 121 is turned off (No in S103) and the case in which the transmission function of the second communication unit 122 is turned on, the signal transmission device 10 functions as the signal relay device 10B or the master relay device 10C and performs an operation to be described below in FIG. 10 or 12. In the case in which the transmission function of the first communication unit 121 is turned off (No in S103) and the case in which the transmission function of the second communication unit 122 is turned off, the signal transmission device 10 is in a state in which the function stops and the communication control unit 120 ends the operation.

Here, an example of the information included in the signal sent in S111 by the signal transmission device 10 functioning as the signal sending device 10A is illustrated in FIG. 9. As illustrated in FIG. 9, the signal sent by the signal sending device 10A may include, for example, data format information of the signal indicating which information is included in the signal, the identification information for specifying the signal transmission device sending the signal, and various kinds of measurement information measured by the sensor unit 170.

Figure 10:
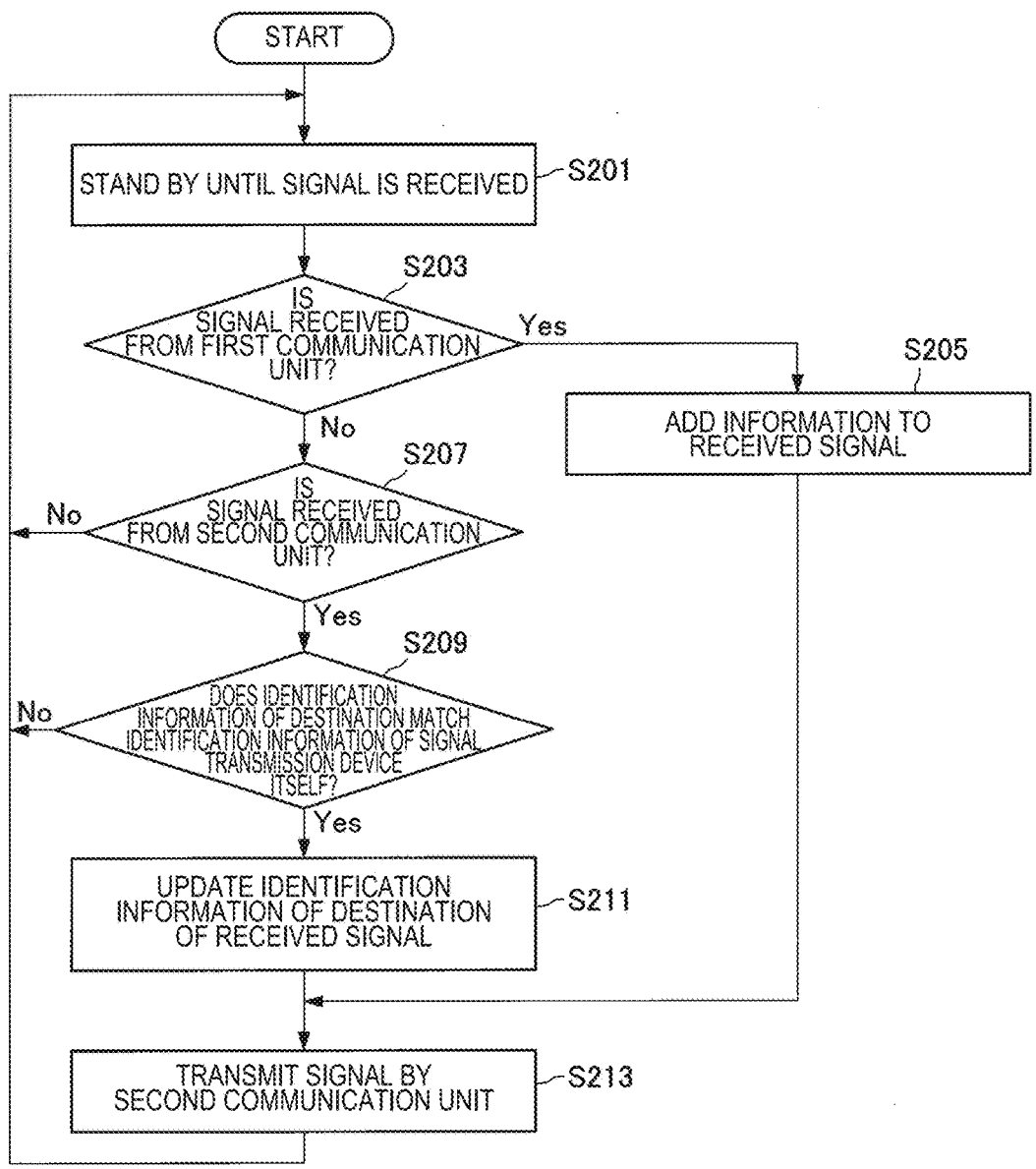
FIG. 10 is a flowchart for describing an example of an operation in a case in which the signal transmission device functions as a signal relay device.

Next, an example of an operation in a case in which the signal transmission device 10 functions as the signal relay device 10B will be described with reference to FIGS. 10 and 11. FIG. 10 is a flowchart for describing an example of the operation in a case in which the signal transmission device 10 functions as the signal relay device 10B. In addition, FIG. 11 is an explanatory diagram illustrating an example of information included in a signal transmitted by the signal relay device 10B. Note that an operation in a case in which the signal transmission device 10 functions as the signal relay device 10B corresponds to an operation of the reception process described in S200 of FIG. 9.

As illustrated in FIG. 10, in the reception process (S200), the communication control unit 120 causes the first communication unit 121 and the second communication unit 122 to stand by in the reception standby state until a signal is received (S201). Subsequently, the communication control unit 120 determines whether or not a signal from another signal transmission device 10 is received in the first communication unit 121 (S203). In a case in which the signal is received in the first communication unit 121 (Yes in S203), the communication control unit 120 controls the information addition unit 160 such that the information is added to the signal (S205). Thereafter, the communication control unit 120 controls the second communication unit 122 such that the signal to which the information is added is transmitted (S213).

Here, the information added by the information addition unit 160 is, for example, the identification information of the signal transmission device 10 receiving the signal, the information regarding the radio wave intensity of the received signal, the identification information of the signal transmission device 10 which is a subsequent reception destination, and the like. In addition, the information addition unit 160 may add information regarding a time at which the signal is received, information regarding a communication scheme of the received signal, and the like.

Conversely, in a case in which the signal is not received in the first communication unit 121 (No in S203), the communication control unit 120 determines whether or not a signal from another signal transmission device 10 is received in the second communication unit 122 (S207). In a case in which the signal is received in the second communication unit 122 (Yes in S207), the communication control unit 120 determines whether or not the identification information of the signal transmission device 10 which is the reception destination of the received signal matches the identification information of the signal transmission device itself (S209). In a case in which the identification information of the signal transmission device 10 which is the reception destination matches the identification information of the signal transmission device itself (Yes in S209), the communication control unit 120 controls the information addition unit 160 such that the identification information of the signal transmission device 10 which is the subsequent reception destination of the signal is updated (S211) and controls the second communication unit 122 such that the signal in which the information is updated is transmitted (S213). Thereafter, the signal transmission device 10 returns to the reception standby state of the signal (S201). Thus, the signal transmission device 10 can function as the signal relay device 10B.

Conversely, in a case in which the signal is not received in the second communication unit 122 (No in S207) or a case in which the identification information of the signal transmission device 10 which is the reception destination is different from the identification information of the signal transmission device itself (No in S209), the signal transmission device 10 temporarily ends the operation and returns to the reception standby state of the signal (S201).

Here, an example of the information included in the signal transmitted in S213 by the signal transmission device 10 functioning as the signal relay device 10B is illustrated in FIG. 11. As illustrated in FIG. 11, the signal transmitted by the signal relay device 10B may include, for example, data format information of the signal indicating which information is included in the signal, the identification information for specifying the signal transmission device sending the signal, and various kinds of measurement information measured by the sensor unit as in FIG. 9.

In addition, the signal transmitted by the signal relay device 10B may include, for example, identification information for specifying the signal transmission device which is a subsequent reception destination, identification information for specifying the signal transmission device 10 receiving the signal, information indicating a time at which the signal is received, and information indicating the radio wave intensity of the received signal. The information is information added to the signal by the signal relay device 10B.

Next, an example of an operation in a case in which the signal transmission device 10 functions as the master relay device 10C will be described with reference to FIGS. 12 and 13. FIG. 12 is a flowchart for describing an example of an operation in a case in which the signal transmission device 10 functions as the master relay device 10C. In addition, FIG. 13 is an explanatory diagram illustrating an example of information included in a signal transmitted from the master relay device 10C to the network connection device 20. Note that an operation in a case in which the signal transmission device 10 functions as the master relay device 10C corresponds to the operation of the reception process described in S200 of FIG. 9.

As illustrated in FIG. 12, in the reception process (S200), the communication control unit 120 first causes the second communication unit 122 to stand by in the reception standby state until a signal is received (S221). Subsequently, the communication control unit 120 determines whether or not a signal from another signal transmission device 10 is received in the second communication unit 122 (S223). In a case in which the signal is received in the second communication unit 122 (Yes in S223), the communication control unit 120 controls the information addition unit 160 such that the information included in the signal is processed (S225) and controls the first communication unit 121 or the second communication unit 122 so that the processed signal is transmitted to the network connection device 20 connected to the communication network 40 (S227). Thereafter, the signal transmission device 10 returns to the reception standby state of the signal (S221). Conversely, in a case in which the signal is not received in the second communication unit 122 (No in S223), the signal transmission device 10 temporarily ends the operation and returns to the reception standby state of the signal (S221). Thus, the signal transmission device 10 can function as the master relay device 10C.

Here, in S225, the information addition unit 160 deletes the identification information for specifying the signal transmission device which is the subsequent reception destination from the received signal. The identification information for specifying the signal transmission device of the subsequent reception destination is information for relaying the signal and is not used to manage the signal sending device 10A. Therefore, it is possible to reduce an amount of information of the signal by deleting the information.

Here, an example of the information included in the signal transmitted in S227 by the signal transmission device 10 functioning as the master relay device 10C is illustrated in FIG. 13. As illustrated in FIG. 13, the signal transmitted by the master relay device 10C may include, for example, data format information of the signal indicating which information is included in the signal, the identification information for specifying the signal transmission device sending the signal, and various kinds of measurement information measured by the sensor unit as in FIG. 11.

In addition, the signal transmitted by the master relay device 10C may include, for example, identification information for specifying the signal transmission device 10 receiving the signal, information indicating a time at which the signal is received, and information indicating the radio wave intensity of the received signal as in FIG. 11. Note that the identification information for specifying the signal transmission device which is the subsequent reception destination is not included in the signal transmitted by the master relay device 10C since the identification information is deleted in S225.

The configurations and operations of the signal transmission devices 10 according to the embodiment have been described in detail above.

3. APPLICATION EXAMPLE OF SIGNAL TRANSMISSION SYSTEM

Next, application examples of the signal transmission system 1 according to the embodiment will be described with reference to FIGS. 14 to 17.

3.1. First Application Example

Figure 14:
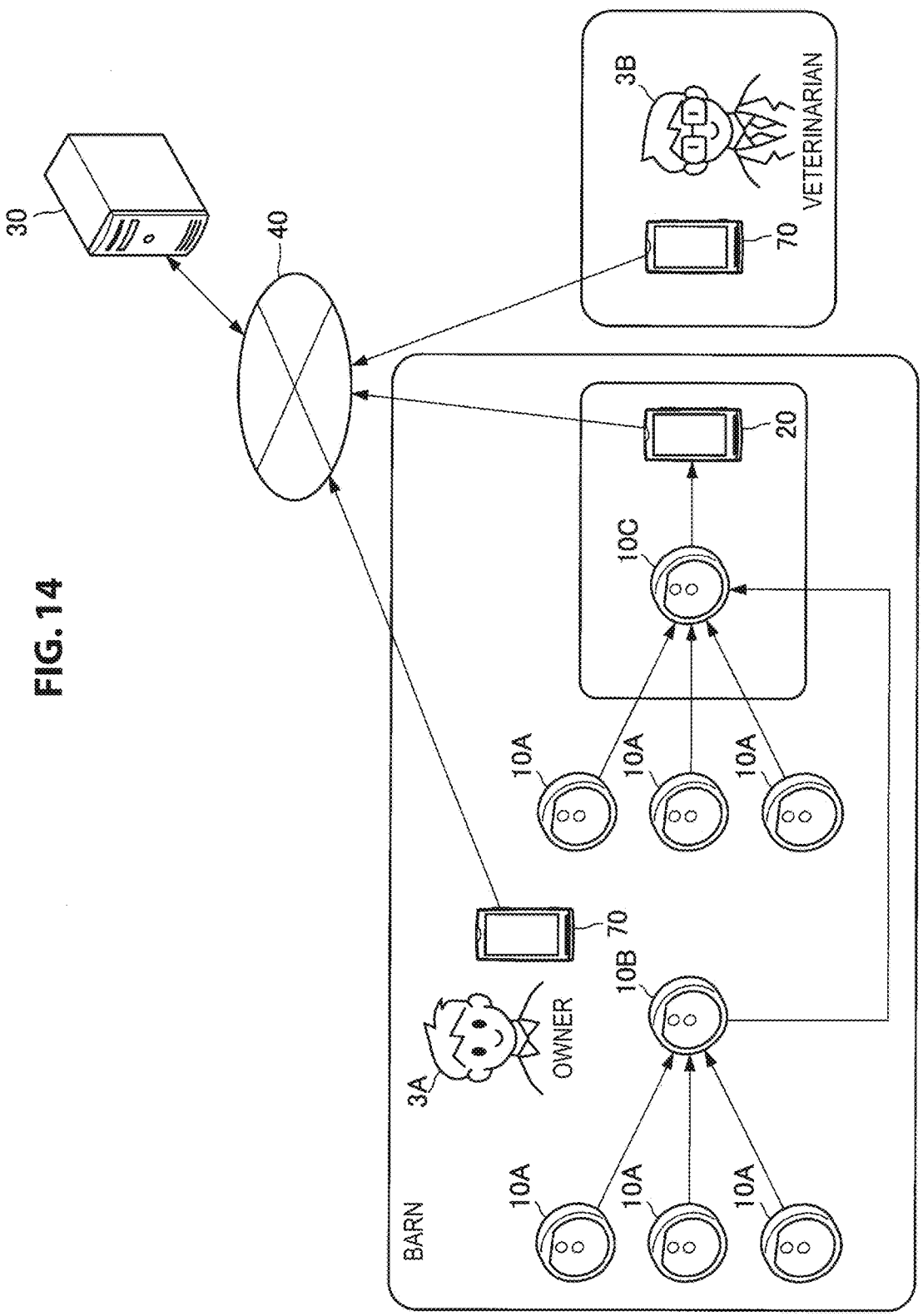
FIG. 14 is an explanatory diagram illustrating a first application example of the signal transmission system according to the embodiment of the present disclosure.

First, a first application example of the signal transmission system 1 according to the embodiment will be described with reference to FIG. 14. FIG. 14 is an explanatory diagram illustrating the first application example of the signal transmission system 1 according to the embodiment.

As illustrated in FIG. 14, the first application example of the signal transmission system 1 according to the embodiment is a system that manages domestic animals by ascertaining positions or the like of domestic animals such as cattle grazing in a pasture or the like.

Specifically, the signal sending devices 10A are mounted on domestic animals such as cattle (not illustrated), and each signal relay devices 10B or each master relay devices 10C is installed in a barn and a grazing land. When the power generated by the power generation unit 110 reaches the predetermined amount, the signal sending device 10A sends the signal to the signal relay device 10B or the master relay device 10C. The signal received by the signal relay device 10B is transmitted to the master relay device 10C and is transmitted to the information processing server 30 via the communication network 40 by the network connection device 20 connected to the master relay device 10C.

Here, for the communication scheme between the signal sending device 10A and the signal relay device 10B and between the signal sending device 10A and the master relay device 10C and the communication scheme between the signal relay device 10B and the master relay device 10C, different communication schemes or frequencies are used. Thus, the master relay device 10C can prevent crossing of the signal from the signal sending device 10A and the signal from the signal relay device 10B.

The information processing server 30 determines the position of each signal sending device 10A on the basis of the identification information of the signal sending device 10A included in the transmitted signal and the identification information of the signal relay device 10B receiving the sent signal. Thus, the information processing server 30 can ascertain the position of each domestic animal on which the signal sending device 10A is mounted.

Accordingly, an owner 3A who manages the domestic animals on which the signal sending devices 10A is mounted can ascertain the positions of the domestic animals on which the signal sending devices 10A are mounted by making connection to the information processing server 30 using the information terminal 70 such as a smartphone or a table terminal. Thus, the owner 3A can confirm whether or not the domestic animals on which the signal sending devices 10A are mounted are in the barn or remain on the grazing land, or the like.

In addition, in a case in which the signal transmitted to the information processing server 30 includes measurement information from various sensors included in the signal sending device 10A, the information processing server 30 registers the measurement information from the various sensors in association with the identification information of the signal sending device 10A. A veterinarian 3B who manages healthy states or the like of the domestic animals on which the signal sending devices 10A is mounted can ascertain the healthy states of the domestic animals on which the signal sending devices 10A are mounted by making connection to the information processing server 30 using the information terminal 70. Thus, the veterinarian 3B can confirm whether there are the domestic animals to be examined.

3.2. Second Application Example

Figure 15:
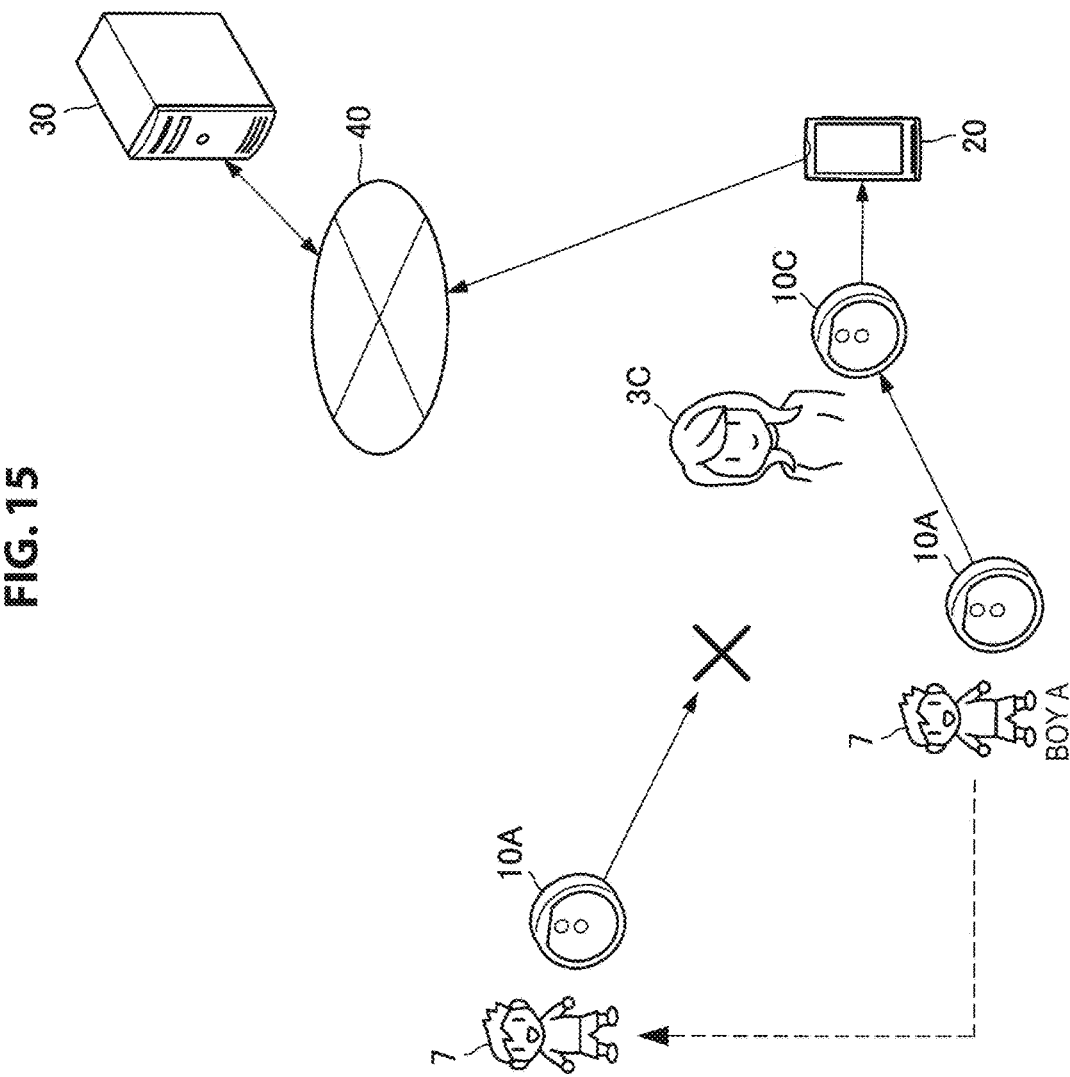
FIG. 15 is an explanatory diagram illustrating a second application example of the signal transmission system according to the embodiment of the present disclosure.
Figure 16:
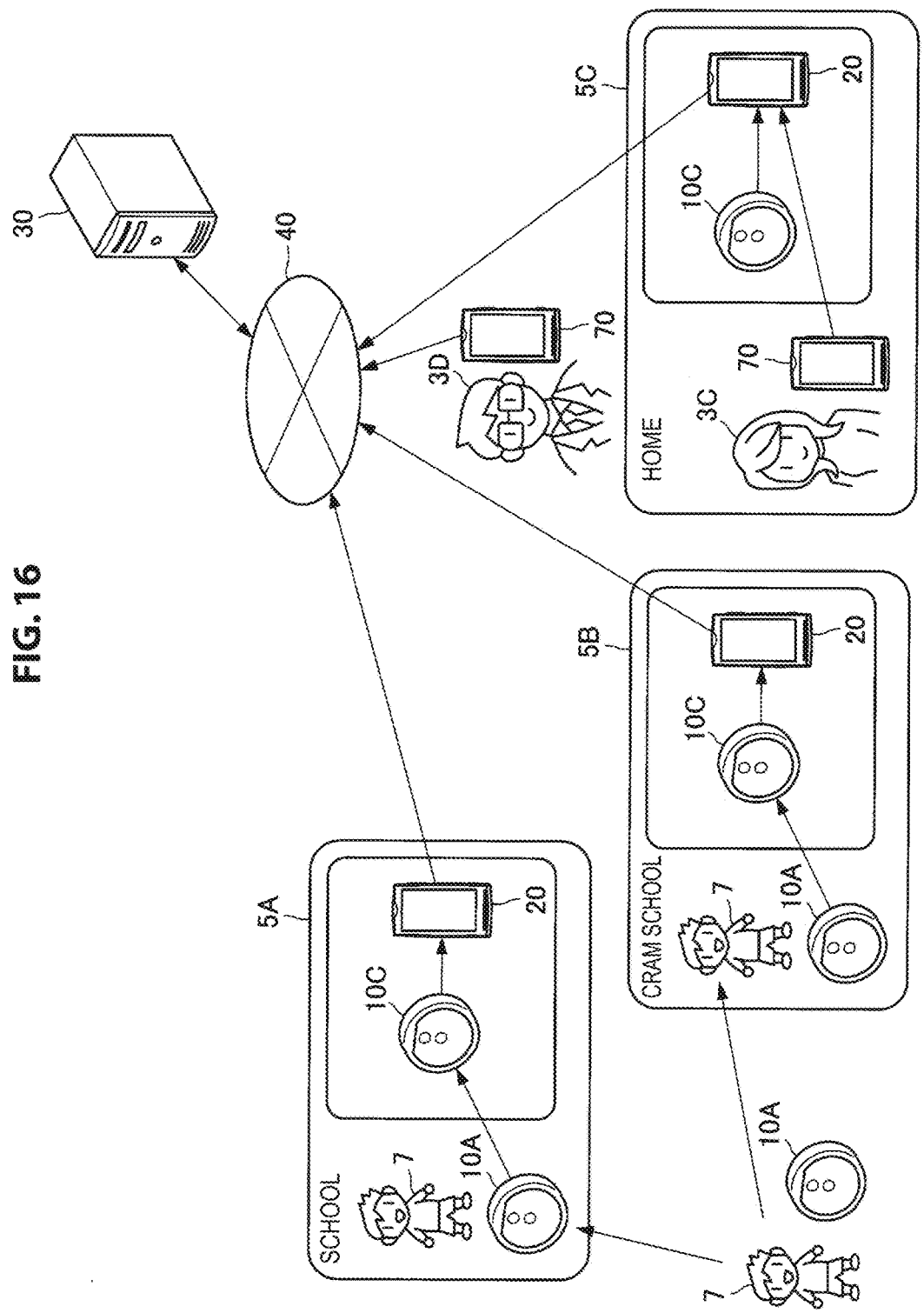
FIG. 16 is an explanatory diagram illustrating a second application example of the signal transmission system according to the embodiment of the present disclosure.
Figure 17:
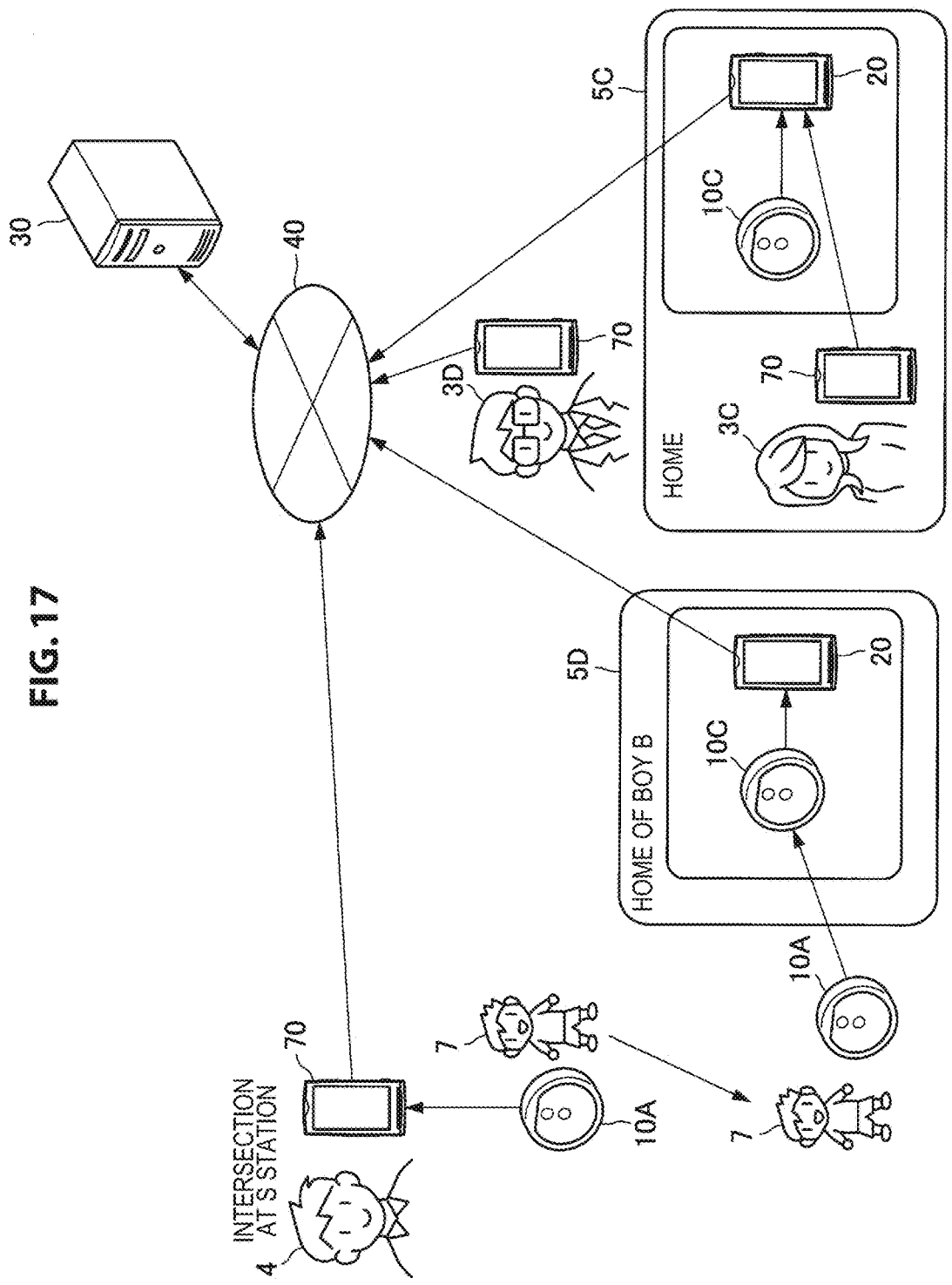
FIG. 17 is an explanatory diagram illustrating a second application example of the signal transmission system according to the embodiment of the present disclosure.

Next, a second application example of the signal transmission system 1 according to the embodiment will be described with reference to FIGS. 15 to 17. FIGS. 15 to 17 are explanatory diagrams illustrating the second application example of the signal transmission system 1 according to the embodiment.

As illustrated in FIGS. 15 to 17, the second application example of the signal transmission system 1 according to the embodiment is a system in which a guardian 3C confirms safety of a watching target 7 such as a child by ascertaining a position of the watching target 7.

Specifically, in a situation illustrated in FIG. 15, the signal sending device 10A is mounted on the watching target 7 (in FIG. 15, boy A) such as a child and sends a signal to the master relay device 10C carried by the guardian 3C of the watching target 7. The signal received by the master relay device 10C is transmitted to the information processing server 30 via the communication network 40 by the network connection device 20 connected to the master relay device 10C.

Here, in a case in which the watching target 7 on which the signal sending device 10A is mounted is away from the guardian 3C carrying the master relay device 10C by a predetermined distance, communication between the signal sending device 10A and the master relay device 10C is not established. Therefore, the information processing server 30 can ascertain that the watching target 7 is away from the guardian 3C on the basis of the fact that the signal from the signal sending device 10A is not received for a predetermined time. In addition, the information processing server 30 can notify the guardian 3C that the watching target 7 is away, via the information terminal 70 (which may also serve as the network connection device 20).

In addition, in a situation illustrated in FIG. 16, the signal sending device 10A is mounted on the watching target 7 and the master relay device 10C is installed in each facility such as a school 5A, a cram school 5B, and a home 5C. In a case in which the watching target 7 on which the signal sending device 10A is mounted enters one of the facilities, the school 5A, the cram school 5B, and the home 5C, the signal sending device 10A falls within a communicable range of the master relay device 10C, and therefore a signal is sent from the signal sending device 10A to the master relay device 10C. The master relay device 10C receiving the signal from the signal sending device 10A transmits the received signal to the information processing server 30 via the communication network 40 in accordance with the network connection device 20.

The information processing server 30 can determine into which facility the watching target 7 on which the signal sending device 10A is mounted enters among the school 5A, the cram school 5B, and the home 5C by determining which master relay device 10C receives the signal from the signal sending device 10A. In addition, in a case in which the signal from the signal sending device 10A is not received in the master relay device 10C, the information processing server 30 can determine that the watching target 7 on which the signal sending device 10A is mounted has exited from the facility on which the master relay device 10C is mounted.

Accordingly, guardians 3C and 3D of the watching target 7 can confirm whether or not the watching target 7 enters or exits from any facility, and which facility the watching target 7 enters or exits from, by making connection to the information processing server 30 using the information terminal 70 such as a smartphone or a tablet terminal. Thus, the guardians 3C and 3D can confirm safety of the watching target 7 by confirming a location of the watching target 7.

Further, in a situation illustrated in FIG. 17, the signal sending device 10A is mounted on the watching target 7 such as a child and the master relay device 10C is installed in each facility such as a home 5D of friend (in FIG. 17, boy B) and a home 5C. In addition, in FIG. 17, a signal sent by the signal sending device 10A can be received not only by the master relay device 10C but also by the information terminal carried by the information terminal 70 carried by a collaborator 4 (for example, an acquaintance of the guardian of the watching target 7) of a guardian or the like of the watching target 7.

In a case in which the watching target 7 such as a child on which the signal sending device 10A is mounted enters either the friend's home 5D or the home 5C, the signal sending device 10A falls within the communication range of the master relay device 10C, and therefore a signal is sent from the signal sending device 10A to the master relay device 10C. In addition, in a case in which the watching target 7 on which the signal sending device 10A is mounted is near the collaborator 4, the signal sending device 10A falls within the communication range of the information terminal 70, and therefore a signal is sent from the signal sending device 10A to the information terminal 70. The master relay device 10C or the information terminal 70 receiving the signal from the signal sending device 10A transmits the received signal to the information processing server 30 via the communication network 40.

The information processing server 30 can acquire information regarding the location of the watching target 7 on which the signal sending device 10A is mounted by determining whether the signal from the signal sending device 10A is received in one of the master relay device 10C or the information terminal 70. Specifically, the information processing server 30 can determine whether the watching target 7 on which the signal sending device 10A is mounted is within the facility in which the master relay device 10C is installed or is near the collaborator 4 carrying the information terminal 70. In addition, in a case in which the information terminal 70 includes a position detector such as a GNSS sensor, the information processing server 30 can specify the position of the signal sending device 10A from a position of the information terminal 70 receiving the signal.

Accordingly, the guardians 3C and 3D of the watching target 7 on which the signal sending device 10A is mounted can confirm whether or not the watching target 7 enters any facility, which facility the watching target 7 enters, or whether or not the watching target 7 is near the collaborator 4, by making connection to the information processing server 30 using the information terminal 70 such as a smartphone or a tablet terminal. Thus, the guardians 3C and 3D can confirm safety of the watching target 7 by confirming a location of the watching target 7.

4. CONCLUSION

As described above, in the signal transmission system 1 according to the embodiment of the present disclosure, it is possible to ascertain the position of the mounting target on which the signal sending device 10A is mounted by ascertaining the signal relay device 10B or the master relay device 10C that has the communicable range in which there is the signal sending device 10A that sends the signal.

In addition, in the signal transmission system 1 according to the embodiment of the present disclosure, the signal sending device 10A sends the signal using the power generated by the built-in power generation unit 110. Accordingly, since it is not necessary for the signal sending device 10A to mount the power source such as a battery, it is possible to reduce a burden on the mounting target and it is possible to improve portability.

Further, in the signal transmission system 1 according to the embodiment of the present disclosure, by controlling whether or not to perform the communication process of the signal transmission device 10 using the communication control information stored in the built-in storage device, the signal transmission device 10 can be caused to function as the signal sending device 10A, the signal relay device 10B, and the master relay device 10C. Thus, in the signal transmission system 1 according to the embodiment of the present disclosure, the function to be performed can be switched by rewriting the communication control information. Therefore, it is possible to improve versatility and flexibility of the construction of the signal transmission system 1.

In addition, the communication control information stored in the built-in storage device is rewritten by contactless communication. Thus, since it is not necessary to provide a switch, a contact, or a terminal in the casing of the signal transmission device 10, it is possible to improve resistance to an external environment of the signal transmission device 10.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A signal transmission device including:

a power generation unit configured to generate power in accordance with a surrounding environment;

a first communication unit configured to send a signal using the power generated by the power generation unit;

a storage unit configured to store communication control information for controlling the first communication unit;

a communication control unit configured to control the first communication unit on a basis of the communication control information; and a contactless communication unit configured to receive rewrite information for rewriting the communication control information stored in the storage unit by contactless communication.

(2)

The signal transmission device according to (1), in which in the storage unit, a rewriting operation to rewrite the communication control information with the rewrite information is performed using power transferred with a carrier wave received by the contactless communication unit and a reading operation to read the communication control information is performed using the power generated by the power generation unit, and the communication control unit controls the first communication unit such that the signal is sent on a basis of the read communication control information.

(3)

The signal transmission device according to (2), further including:

a power storage unit configured to store the power generated by the power generation unit, in which the communication control unit performs a reading operation to read the communication control information from the storage unit using the power generated by the power generation unit in a case in which the power stored in the power storage unit reaches a predetermined amount.

(4)

The signal transmission device according to (3), in which the first communication unit consumes the power stored by the power storage unit to send the signal, and the communication control unit performs reading of the communication control information from the storage unit and controlling of the first communication unit based on the read communication control information whenever the power stored in the power storage unit reaches the predetermined amount.

(5)

The signal transmission device according to any one of (2) to (4), in which the power generation unit includes a photovoltaic element or a vibration power generation element.

(6)

The signal transmission device according to any one of (2) to (5), further including:

a casing configured to be physically mounted on a movable management target, in which the casing has a structure in which the power generation unit, the first communication unit, the storage unit, the communication control unit, and the contactless communication unit are accommodated inside the casing.

(7)

The signal transmission device according to any one of (1) to (6), in which the signal sent by the first communication unit includes identification information of the signal transmission device sending the signal.

(8)

The signal transmission device according to any one of (1) to (7), further including:

a second communication unit, in which the first communication unit receives a signal sent by a first communication unit of another signal transmission device and the second communication unit wirelessly transmits the signal received by the first communication unit.

(9)

The signal transmission device according to (8), further including:

an information addition unit configured to add the identification information of the signal transmission device receiving the signal to the signal received by the first communication unit, in which the second communication unit wirelessly transmits the signal to which the identification information is added.

(10)

The signal transmission device according to (9), in which the information addition unit adds information regarding a radio wave intensity of the received signal to the signal received by the first communication unit.

(11)

The signal transmission device according to (9) or (10), in which the information addition unit adds the identification information of the signal transmission device which is a subsequent reception destination of the signal, as destination information, to the signal received by the first communication unit.

(12)

The signal transmission device according to any one of (8) to (11), in which the second communication unit and the first communication unit transmit signals in conformity with different communication schemes or frequencies.

(13)

The signal transmission device according to (11) or (12), in which the second communication unit receives a signal wirelessly transmitted by a second communication unit of another signal transmission device, in a case in which the destination information of the received signal matches the identification information of the signal transmission device, the information addition unit updates the destination information of the signal received by the second communication unit, and the second communication unit wirelessly transmits the signal of which the destination information is updated.

(14)

The signal transmission device according to any one of (8) to (13), in which a communicable distance of the signal wirelessly transmitted by the second communication unit is longer than a communicable distance of the signal sent by the first communication unit.

(15)

The signal transmission device according to any one of (8) to (14), in which the communication control unit controls the first communication unit and the second communication unit on the basis of the communication control information.

(16)

The signal transmission device according to (15), in which the communication control information includes information regarding whether or not a signal transmission process in the first communication unit and the second communication unit is performed.

(17)

The signal transmission device according to (15) or (16), in which the communication control information includes information regarding whether or not a signal reception process in the first communication unit and the second communication unit is performed.

(18)

The signal transmission device according to any one of (1) to (17), further including:

a sensor unit configured to measure the surrounding environment or a state of the signal transmission device, in which the signal sent by the first communication unit includes information regarding the state measured by the sensor unit.

(19)

A signal transmission method including:

rewriting communication control information stored in a signal transmission device with rewrite information received by contactless communication;

generating power in accordance with a surrounding environment; and sending a signal using the generated power on a basis of the communication control information.

(20)

A signal transmission system including:

a signal transmission device including a power generation unit configured to generate power in accordance with a surrounding environment, a first communication unit configured to send a signal using the power generated by the power generation unit, a storage unit configured to store communication control information for controlling the first communication unit, a communication control unit configured to control the first communication unit on a basis of the communication control information, and a contactless communication unit configured to receive rewrite information for rewriting the communication control information stored in the storage unit by contactless communication; and a signal relay device including a relay communication unit configured to receive the signal sent from the first communication unit of the signal transmission device, and a second communication unit configured to wirelessly transmit the received signal.

REFERENCE SIGNS LIST 1 signal transmission system
10 signal transmission device
10A signal sending device
10B signal relay device
10C master relay device
110 power generation unit
111 power control unit
112 power storage unit
120 communication control unit
121 first communication unit
122 second communication unit
130 contactless communication unit
140 storage unit
150 timer unit
160 information addition unit
170 sensor unit

The invention claimed is:

1. A signal transmission device comprising:
a power generator able to generate power in accordance with a surrounding environment;
a first communicator able to send a signal using the power generated by the power generator, and able to receive a signal sent by another first communicator of another signal transmission device;
a memory storing communication control information for controlling the first communicator;
a communication controller able to control the first communicator based on the communication control information;
a contactless communicator able to receive rewrite information via a contactless communication, wherein the contactless communicator rewrites the communication control information stored in the memory, with the rewrite information;
an information adder able to add identification information of the signal transmission device, which received the signal, to the signal received by the first communicator; and
a second communicator able to perform wireless transmission, wherein the second communicator wirelessly transmits the signal to which the identification information has been added.

2. The signal transmission device according to claim 1, wherein
in the memory, a rewriting operation to rewrite the communication control information with the rewrite information is performed using power transferred with a carrier wave received by the contactless communicator, and a reading operation to read the communication control information is performed using the power generated by the power generator, and
the communication controller controls the first communicator such that the signal is sent by the first communicator based on the read communication control information.

3. The signal transmission device according to claim 2, further comprising:
a power storage unit able to store the power generated by the power generator,
wherein the communication controller performs the reading operation to read the communication control information from the memory using the power generated by the power generator in a case in which the power stored in the power storage unit has reached a predetermined amount.

4. The signal transmission device according to claim 3, wherein
the first communicator consumes the power stored by the power storage unit to send the signal, and the communication controller performs reading of the communication control information from the memory and controlling of the first communicator based on the read communication control information whenever the power stored in the power storage unit has reached the predetermined amount.

5. The signal transmission device according to claim 2, wherein the power generator includes a photovoltaic power generator or a vibration power generator.

6. The signal transmission device according to claim 2, further comprising:
a casing configured to be physically mounted on a movable management target,
wherein the casing has a structure in which the power generator, the first communicator, the memory, the communication controller, and the contactless communicator are accommodated inside the casing.

7. The signal transmission device according to claim 1, wherein the signal sent by the first communicator includes identification information of the signal transmission device from which the signal was sent.

8. The signal transmission device according to claim 1, wherein the information adder adds information regarding a radio wave intensity of the signal received by the first communicator to the signal received by the first communicator.

9. The signal transmission device according to claim 1, wherein the information adder adds to the signal received by the first communicator the identification information of the signal transmission device, which is a subsequent reception destination of the signal received by the first communicator, as destination information.

10. The signal transmission device according to claim 1, wherein the second communicator and the first communicator transmit signals in conformity with different communication schemes or frequencies.

11. The signal transmission device according to claim 9, wherein
the second communicator receives a signal wirelessly transmitted by another second communicator of another signal transmission device,
in a case in which the destination information of the signal received by the second communicator matches the identification information of the signal transmission device, the information adder updates the destination information of the signal received by the second communicator, and
the second communicator wirelessly transmits the signal having the updated destination information.

12. The signal transmission device according to claim 1, wherein a communicable distance of the signal wirelessly transmitted by the second communicator is longer than a communicable distance of the signal sent by the first communicator.

13. The signal transmission device according to claim 1, wherein the communication controller controls the first communicator and the second communicator based on the communication control information.

14. The signal transmission device according to claim 13, wherein the communication control information includes information regarding whether or not a signal transmission process in the first communicator and the second communicator is to be performed.

15. The signal transmission device according to claim 13, wherein the communication control information includes information regarding whether or not a signal reception process in the first communicator and the second communicator is to be performed.

16. The signal transmission device according to claim 1, further comprising:
a sensor able to measure a state of the surrounding environment or a state of the signal transmission device,
wherein the signal sent by the first communicator includes information regarding the state measured by the sensor.

17. A signal transmission method of a signal transmission device, the method comprising:
receiving a signal sent by a second signal transmission device;
adding identification information of the signal transmission device to the received signal sent by the second signal transmission device;
rewriting communication control information stored in a signal transmission device with rewrite information received by a contactless communication;
generating power in accordance with a surrounding environment; and
wirelessly sending the received signal to which the identification has been added, the sending using the generated power, and the sending being based on the communication control information rewritten with the rewrite information.

18. A signal transmission system comprising:
a signal transmission device including:
a power generator able to generate power in accordance with a surrounding environment,
a first communicator able to send a signal using the power generated by the power generator, and able to receive a signal sent by another first communicator of another signal transmission device,
a memory storing communication control information for controlling the first communicator,
a communication controller able to control the first communicator based on the communication control information,
a contactless communicator able to receive rewrite information via contactless communication, wherein the contactless communicator rewrites the communication control information stored in the memory, with the rewrite information, and
an information adder able to add identification information of the signal transmission device, which received the signal, to the signal received by the first communicator; and
a signal relay device including:
a relay communicator able to receive the signal sent from the first communicator of the signal transmission device, and
a second communicator able to perform wireless transmission, wherein the second communicator wirelessly transmits the signal to which the identification information has been added, obtained from the first communicator.

* * * * *